US007172113B2

(12) United States Patent
Olenick et al.

(10) Patent No.: US 7,172,113 B2
(45) Date of Patent: Feb. 6, 2007

(54) SYSTEM AND METHOD FOR CREATING A DISPLAY CARD

(75) Inventors: Michael Olenick, Irvine, CA (US); Mary Miller, Orange, CA (US); Deborah Medrano, Sierra Madre, CA (US); Adam Bratter, Newport Coast, CA (US)

(73) Assignee: Avery Dennison Corporation, Pasadena, CA (US)

( * ) Notice: Subject to any disclaimer, the term of this patent is extended or adjusted under 35 U.S.C. 154(b) by 303 days.

(21) Appl. No.: 10/662,758

(22) Filed: Sep. 15, 2003

(65) Prior Publication Data

US 2004/0099731 A1 May 27, 2004

Related U.S. Application Data

(60) Provisional application No. 60/446,817, filed on Feb. 11, 2003, provisional application No. 60/466,689, filed on Apr. 30, 2003, provisional application No. 60/432,941, filed on Dec. 11, 2002, provisional application No. 60/411,268, filed on Sep. 16, 2002.

(51) Int. Cl.
*G06K 5/00* (2006.01)

(52) U.S. Cl. ....................................... 235/380; 235/486

(58) Field of Classification Search ................ 235/380, 235/375, 382, 485, 486

See application file for complete search history.

(56) References Cited

U.S. PATENT DOCUMENTS 3,318,428 A 5/1967 Klein
4,653,775 A 3/1987 Raphael et al.

(Continued)

FOREIGN PATENT DOCUMENTS

EP 0 482 846 A 4/1992

(Continued)

OTHER PUBLICATIONS

Nextnode International Nework Corporation, 102310 Badge Maker Kit II product description, http://www.aniprint.com/products/102310a.htm printout dated May 4, 2004.

(Continued)

*Primary Examiner*—Thien M. Le
*Assistant Examiner*—Edwyn Labaze
(74) *Attorney, Agent, or Firm*—Law Office of Joel D. Voelzke

(57) ABSTRACT

A system and method enables a user such as a visitor to a facility to create a photographic identification card for himself. The user terminal prompts a user to enter identifying information including his name, and takes a photograph of the user. An identification badge is printed for the user upon predefined media. The identification card may be provided with a barcode and unique identification number. The user may be presented with a preview of the identification as the identification card is to be printed. Upon exiting the location, the user may scan the barcode or enter the unique identification number to sign out of the system and exit the location. A user activity log may be maintained at a server such that each time an identification card is created, printed or signed out, the log is updated with information regarding the user information, date, time, location or other information.

34 Claims, 12 Drawing Sheets

U.S. PATENT DOCUMENTS

| | | | | |
|---|---|---|---|---|
| 4,900,903 | A | 2/1990 | Wright et al. | |
| 5,075,769 | A | 12/1991 | Allen et al. | |
| 5,180,906 | A | 1/1993 | Yamada | |
| 5,343,386 | A | 8/1994 | Barber | |
| 5,442,162 | A | 8/1995 | Armel | |
| 5,617,528 | A | 4/1997 | Stechmann et al. | |
| 5,717,776 | A | 2/1998 | Watanabe | |
| 5,814,796 | A | 9/1998 | Benson et al. | |
| 5,913,542 | A | 6/1999 | Belucci et al. | |
| 6,000,608 | A | 12/1999 | Dorf | |
| 6,002,427 | A | 12/1999 | Kipust | |
| 6,014,748 | A | 1/2000 | Tushie et al. | |
| 6,038,012 | A | 3/2000 | Bley | |
| 6,078,756 | A * | 6/2000 | Squilla et al. | 396/300 |
| 6,104,922 | A | 8/2000 | Baumann | |
| 6,142,531 | A | 11/2000 | Harris, II | |
| 6,197,396 | B1 * | 3/2001 | Haas et al. | 428/40.1 |
| 6,220,515 | B1 | 4/2001 | Bello | |
| 6,230,148 | B1 | 5/2001 | Pare, Jr. et al. | |
| 6,292,092 | B1 | 9/2001 | Chow et al. | |
| 6,308,886 | B1 | 10/2001 | Benson et al. | |
| 6,335,799 | B1 | 1/2002 | Provost | |
| 6,356,942 | B1 | 3/2002 | Bengtsson et al. | |
| 6,394,356 | B1 * | 5/2002 | Zagami | 235/487 |
| 6,402,028 | B1 | 6/2002 | Graham, Jr. et al. | |
| 6,412,692 | B1 | 7/2002 | Miyagawa | |
| 6,632,250 | B1 * | 10/2003 | Lynch et al. | 715/517 |
| 6,801,907 | B1 * | 10/2004 | Zagami | 707/3 |
| 6,804,786 | B1 * | 10/2004 | Chamley et al. | 726/20 |
| 6,867,683 | B2 * | 3/2005 | Calvesio et al. | 340/5.52 |
| 7,028,012 | B2 * | 4/2006 | St. Vrain | 705/64 |
| 7,118,027 | B2 * | 10/2006 | Sussman | 235/375 |
| 2001/0053947 | A1 * | 12/2001 | Lenz et al. | 700/117 |
| 2003/0070072 | A1 * | 4/2003 | Nassiri | 713/168 |
| 2003/0151761 | A1 * | 8/2003 | Burns | 358/1.14 |
| 2004/0050931 | A1 * | 3/2004 | Ono et al. | 235/380 |
| 2004/0205652 | A1 * | 10/2004 | Simpson et al. | 715/530 |
| 2005/0058369 | A1 * | 3/2005 | Sanse et al. | 382/282 |
| 2005/0168775 | A1 * | 8/2005 | Liu | 358/1.15 |
| 2005/0284931 | A1 * | 12/2005 | Adams et al. | 235/382 |
| 2006/0087410 | A1 * | 4/2006 | Garcia et al. | 340/309.16 |

FOREIGN PATENT DOCUMENTS

| | | | |
|---|---|---|---|
| GB | 2 100 490 | A | 12/1982 |
| WO | WO 93/16447 | A | 8/1993 |
| WO | WO 97/04353 | A | 2/1997 |
| WO | WO 99/66448 | A | 12/1999 |
| WO | WO 00/28485 | A | 5/2000 |
| WO | WO 01/95269 | A | 12/2001 |

OTHER PUBLICATIONS

"Visitor System for Picture Perfect" brochure, GE Interlogix, Inc., General Electric Company, bearing notation "© 2002 GE Interlogix, Inc.".

Acess Sentry product characterization (internal document prepared by Avery Dennison Corporation), dated Feb. 26, 2003.

Access Sentry(TM) product brochure, marked with "(c) 2000 C13 Software" and accompanying CD ROM disc marked "(c) 2001 C13 Software(TM)".

Access Specialties ASI 2000 product brochure, Photo Gold(TM) product description and screens, and accompanying cover letter dated Oct 17, 2002.

Access Specialties product characterization (internal document prepared by Avery Denison Corporation), dated Feb. 26, 2003.

AsuraID(TM) Enterprise product brochure, marked "(c) 2002 Synercard Corporation . . . Printed in Canada Jan. 2002".

Easy Lobby SVM 6.0 product characterization (internal document prepared by Avery Dennison Corporation), dated Feb. 26, 2003.

EasyLobby Badge Sample, marked with "Apr. 4, 2001".

EasyLobby product description in email from EasyLoby representative, sent Feb. 18, 2003.

EasyLobby(R) SVM(TM) 6.0 Product Brochure, marked "(c)2002-2003 EasyLobby, Inc.".

GBC Video ID System product characterization (internal document prepared by Avery Dennison Corportation), dated Feb. 26, 2003.

HID Corporation proximity card and reader product brochure, marked as "(c) 2001 HID Corporation.".

IDville ID Maker(TM) product brochure and cover letter dated Feb. 17, 2003.

IDville product characterization (internal document prepared by Avery Dennison Corpration), dated Feb. 26, 2003.

Laminex ID in a Flash(TM) product brochure and catalog, and cover letter dated 2002.

Laminex product characterization (internal document prepared by Avery Dennison Corporation, dated Feb. 26, 2003.

Lenel OnGuard product characterization (internal document prepared by Avery Dennison Corporation), dated Feb. 26, 2003.

Lenel Systems International, Inc. press release entitled "Lenel Launches OnGuard E-VISITOR(TM), the First Internet-Based Visitor Management Solution in the Security Industry," marked Sep. 28, 1999, printout dated Jun. 11, 2002.

New York Times, "Advancing Technology Tightens Building Security" http://www.nytimes.com/2003/03/05business, New York Times, Mar. 5, 2003.

Sisco Fast Pass product characterization. (internal document prepared by Avery Dennison Corporation), dated Feb. 26, 2003.

Sisco FAST-PASS(R) product brochure, marked as "Original Drawing Mar. 16, 2002".

Software House C*CURE(R) 800/8000 product brochure, marked "(c)2002".

Software House product characterization (internal document prepared by Avery Dennison Corporation), dated Feb. 26, 2003.

STOPware Passage Point product characterization (internal document prepared by Avery Dennison Corporation), dated Feb. 26, 2003.

STOPware(TM) PassagePoint v4.0 product brochure, marked with "Pricing good till Dec. 31, 2002".

Transtech Systems, Inc. Episuite product brochure, marked "(c) 2002 Image Ware Systems, Inc.".

USI Video ID System Office Security—Video ID System product description, printed from http://machinerunner.com/Video-ID-systems/USI-Video-ID-System.html, printout Feb. 25, 2003.

Web page entitled "Alpha Card Systems—Identification Badge & Card System," and related pages, http://ww.a-card.com/information/identificationcardsystemindex.html, printout dated Jul. 19, 2002.

Web page entitled "Hartford Badges, your source for name badges, photo ID's and more . . . ," marked as "(c) 1996-2002 by Hartford Badges," http://www.hartfordbadges.com/, printout dated Jul. 19, 2002.

Web page entitled "identification Resources" and related pages, http://www.idresources.com/, printout dated Jul. 19, 2002.

Web page entitled "OneCard Online" and related pages, http://www.onecardonline.com/onchome.html, printout dated Jul. 19, 2002.

Web page entitled "The Dexa.Badge Offering," http://www.slb.com/Hub/Docs/tt/nws/dexa/L2_badge.html, marked as Copyright 2001 Schlumberger Limited, printout dated Jul. 19, 2002.

Bradesko et al, Identification Procedures, Using the Combination of Optical and Chipcard, IEEE, 1991, pp. 1192-1195.

Dittmann et al., Hologram Watermarks for Document Authentications, IEEE, 2001, pp. 60-64.

Rose, Barbara, Zebra to acquire maker of photo ID card printers, Chicago Tribune, Nov. 2003, p. 4.

PCT International Search Report in corresponding International Application No. PCT/US03/29093.

Supplementary European Search Report, Jun. 28, 2006 in corresponding EPO Application No. EP03770341.

* cited by examiner

200

Report Requested as of 11:30 AM June 14, 2002

Checked-In Visitors

| Name | Location | Host | Check-In Time | Check-Out Time |
|---|---|---|---|---|
| John Smith | Room 437 | Dan Johnson | 09:00 AM 06/14/2002 | N/A |
| Mary Martin | Room 437 | Dan Johnson | 09:01 AM 06/14/2002 | N/A |
| Ray Hayashi | Conf. Room 8 | Brenda Lee | 08:30 AM 06/14/2002 | N/A |
| Michael Jones | Cube 468A | Robert Bailey | 10:00 AM 06/14/2002 | N/A |

Checked-Out Visitors

| Name | Location | Host | Check-In Time | Check-Out Time |
|---|---|---|---|---|
| Jane Doe | Room 582 | Bonnie Fisher | 07:00 AM 06/14/2002 | 09:00 AM 06/14/2002 |
| Steve Diggler | Room 582 | Bonnie Fisher | 07:01 AM 06/14/2002 | 09:01 AM 06/14/2002 |
| Debbie Austin | Conf. Room 9 | Diane Choi | 09:30 AM 06/14/2002 | 11:00 AM 06/14/2002 |

FIG. 11

SYSTEM AND METHOD FOR CREATING A DISPLAY CARD

RELATED APPLICATIONS

This application claims priority from the following U.S. patent applications:

provisional application Ser. No. 60/446,817, filed Feb. 11, 2003; provisional application Ser. No. 60/411,268, filed Sep. 16, 2002; provisional application Ser. No. 60/432,941, filed Dec. 11, 2002; provisional application Ser. No. 60/466,689, filed Apr. 30, 2003; and non-provisional patent application Ser. No. 10/641,132, filed Aug. 14, 2003. The entire contents of all of these applications are incorporated by reference.

FIELD OF THE INVENTION

The invention relates to a system and method for creating a display card. The display card may be used as an identification badge to gain access and/or identify a user, company, or other entity at a location.

BACKGROUND OF THE INVENTION

Recently, security concerns have increased dramatically. After the events of Sep. 11, 2001, a renewed awareness for security has been raised. Many countries, governments, businesses, and even individuals have implemented new security procedures in light of these events. Many of the new security procedures relate to the airline travel industry. However, new security procedures for entering a government building or other location have also been implemented.

Such new security procedures for entering a government building or business location include more rigorous screening procedures and issuance of an identification card. One drawback of known methods for issuing an identification card is that the identification card may not be immediately available. A user may need to submit contact information such as name, address, company name, and other information that is to be printed on the identification card. The user may also be required to either submit a photograph of the user or have a photograph taken. After receiving the user contact information and photograph, the user information and photograph are submitted to a central location for printing the identification card. Therefore, the user may have to wait up to several days or more to receive the identification card. The identification card may need to be printed at a central location because a particular type of printer may need to be used to print the identification card. The user may be provided with a temporary pass until the identification card is received. The temporary pass, however, may not include a photograph of the user. Therefore, because the user may be required to use a temporary pass for a period of time, the user may be using a less secure identification card which may be lost or stolen and used by an unauthorized user.

Another drawback with existing systems is that a photograph of a user may not provide an accurate depiction of the user. For example, the user may change hairstyle and/or hair color which may not be shown in the photograph. Therefore, if the user desires to obtain an identification card reflecting a change in personal appearance, the user may be required to repeat the process described above and be issued another temporary pass while a new identification card is printed and forwarded to the user.

Systems for creating identification cards are known. However, present systems have various drawbacks. For example, U.S. Pat. No. 5,617,528 issued to Stechmann et al. discloses a card creation apparatus. The apparatus, however, enables a user to specify locations of layout frames of a video picture and cardholder information fields which are to be printed on a card. Enabling the user to specify where cardholder information and a picture are to be printed on the card results in various card configurations that are more time consuming to read because information is not located in a designated position. U.S. Pat. No. 6,394,356 discloses an access control system. The system obtain an image of an identification card of a user so that the image may be placed on an access pass along with other user information. This is troublesome for users that may not have an identification card that may be used.

SUMMARY OF THE INVENTION

The invention relates to a system and method for creating a display card such as an identification badge. The system provides a flexible, inexpensive and user-friendly solution for creating photographic identification badges. The system does not require expensive proprietary technology such as specialty printers which require expensive ribbons, or proprietary networking technologies which require extensive training and maintenance. The system smoothly integrates the photograph taking process into the data input process, thus eliminating the need in prior art badge creation systems for separate and inconvenient procedures for taking a visitor's photograph.

According to one embodiment, the display card produced by the system may be used as an identification card that may be used to gain access to or identify a user at a location. The display card may also be used to monitor access to the location. The invention provides a system and method for printing a display card having user information and a photograph of a user on the card. The display card may be, for example, an identification card, name badge, company name and/or slogan, or any other type of information displaying card. The display card may also be printed for a specific event. By way of example, the invention is described in terms of an identification card.

The identification card is preferably created and printed at the location. The system may include a monitor that presents various displays to the user. The displays may vary depending on the user and a step of the method that the user is attempting to complete. An initial display may present an option to the user that enables the user to create an identification card. After a user selects the option, the user may be presented with one or more input fields for inputting user information. The input fields may be based on a dynamic or static template that may be stored at a client device and/or on a server. The dynamic templates may be used to present a user with a predetermined sequence of displays and/or input fields. The dynamic templates help to ensure that the user is required to input as much information as the host requires, but no more information than is required, thus saving time and making the system more hospitable. A preview of the identification card may be presented along with the input fields. Therefore, as the user inputs the user information, the information may be displayed in the preview of the identification card showing the user how the information is going to be printed on the identification card. The preview preferably displays the identification card on a print media onto which the identification card is to printed.

As part of the data entry process, the user may be requested to pose for a photograph to be placed on the identification card. The preview of the identification card may include a photograph area that presents an image to the user of the photograph to be taken. The system may notify the user as to a particular time when the photograph is to be taken. The user is given an opportunity to preview the photograph taken by the system as it will appear on the final badge, and either accept the photograph or reject it and take a different photograph.

After accepting the photograph, the photograph may be presented in the preview of the identification card. The user may then print the identification card. The invention enables the identification card to be quickly printed on one of a plurality of print media. The identification card printed may be the identification card shown in the preview. The preview of the identification card may include the user information and photograph as well as a unique identifier such as a barcode and/or a unique identification number.

The information entered by the user may be transmitted via hyper-text transmission protocol (http) to a central server that stores the information for later retrieval. The server may be located on the same machine, on a different machine in the same building, or at an entirely remote location. The server receives and stores the data in real time as the identification badge is being printed. Once the data resides on the server it may be queried by others for a plurality of reasons. These reasons include a desire to see who is visiting a particular building via a particular entrance, a desire to see who checked into a building but did not check out in order to evacuate the building, or to see if a photograph of a particular person who entered a building and who is suspected of doing something undesirable does not match other photographs available of the person of the same name.

After selecting an option to print the identification card, the user may be presented with an option to request that the identification card be re-printed. If the user does not request that the identification card be re-printed, the user may use the identification card to access a location for which the identification card was issued.

According to one embodiment of the invention, the system may enable the user to scan the barcode provided on the identification card upon exiting the location. A barcode scanner may be provided such that when the user exists the location, the user may place the barcode of the identification card under the scanner and have the system recognize that the user has exited the location. If a user has difficulty scanning the barcode, the display may present the user with a manual sign out option. Upon selecting the manual sign out option, the user may be presented with a request to input the unique identification number provided on the identification card. The user may input the unique identification number in an input field using, for example, a conventional keyboard or numeric keypad. The user may submit the unique identification number to the system and if the unique identification number is recognized, the system may present the user with a message indicating that the unique identification number has been recognized. If the unique identification number is not recognized, however, the system may request that the user re-input the unique identification number. This process may be repeated until the barcode is properly scanned or the unique identification number is recognized.

According to one embodiment of the invention, a server may be in communication with a number of different clients devices located at the location. The server and client device may communicate over a network such as the Internet or an internal company Intranet. The server may be used to maintain a log of user activity at the location. For example, a log may maintain a record of when an identification card was created and printed, when a barcode of an identification card was scanned or when a unique identification number was input by a user and recognized by the system upon the user exiting the location. The log may maintain a record as to who created an identification card, the date and time which the card was created, the date and time when the user exited the location, the location of the location, and/or other information.

According to another embodiment, a central web server is in communication with a number of different visitor identification card making stations. Each station collects information from visitors via appropriate prompts and data input devices, prints respective identification cards for visitors based on the collected data, and sends the collected data to the web server for central control, storage, archiving, retrieval, monitoring, and report generation. The web server may reside on the same machine as one of the clients, or it may reside on its own separate machine.

The media on which the identification cards are printed may be identification card media having one or more predefined identification card boundary formed therein such as by die cutting. After obtaining the visitor's name, photograph, and other desired information via appropriate prompts, the system prints an identification card onto the identification card media within the predefined identification card boundaries. The visitor may then be provided with instructions for completing the identification card, such as be peeling the identification card away from the remainder of the media and folding it or otherwise manipulating it to form an identification card. The instructions may be provided in the form of written instructions provided on the badge media, written instructions provided on other paper to the visitor, or written instructions and illustrations provided on the system's display screen. The system may employ a desktop printer such as a color inkjet printer or a color laser printer. The user's name, photograph, and any other information obtained from the visitor, may be stored to non-volatile storage media such as disc or tape, along with other data regarding the creation and use of the badge, into a remote database.

The system may also allow a remote attendant or receptionist to service a number of geographically separate facilities or facility entrances. Using the system, a facility could eliminate the need for an attendant or security guard to by physically present at the particular facility entrance. Each lobby supported could be provided with one self-service kiosk, with a remote attendant available by video and/or audio connection to monitor the badge creation process, provide assistance as necessary to the visitor in the badge creation process, and call the person visited to advise her that her visitor has arrived and has been badged and checked in, and is ready to be allowed into the facility and escorted.

BRIEF DESCRIPTION OF THE DRAWINGS

FIG. 11 illustrates a log of user activity according to one embodiment of the invention.

DETAILED DESCRIPTION OF THE PREFERRED EMBODIMENTS

According to one embodiment, the invention relates to a system and method for creating and printing a display card. According to one embodiment, the display card may be an identification card that is printed and used for identifying a user at a location and/or monitoring access to the location. The display card may be any type of information conveying mechanism. The display card may be, for example, a name badge that has only a user's name printed thereon, a high-level security identification card that includes a photograph and other user information and identifiers that enables access to one or more secure locations, or any variation thereof. The display card may be associated with a particular event. For example, the display card may include text and/or graphics that relate to a specific event. The display card may, for example, have balloons and ice cream cones printed thereon if the display card is to be used at an ice cream social. By way of example, the invention is described is terms of an identification card. Finally, the name badge may be a low-power display device, such as an OLED or PLED display, that temporarily reflects the information entered by the user and may be worn throughout a visit and then returned.

Figure 1:
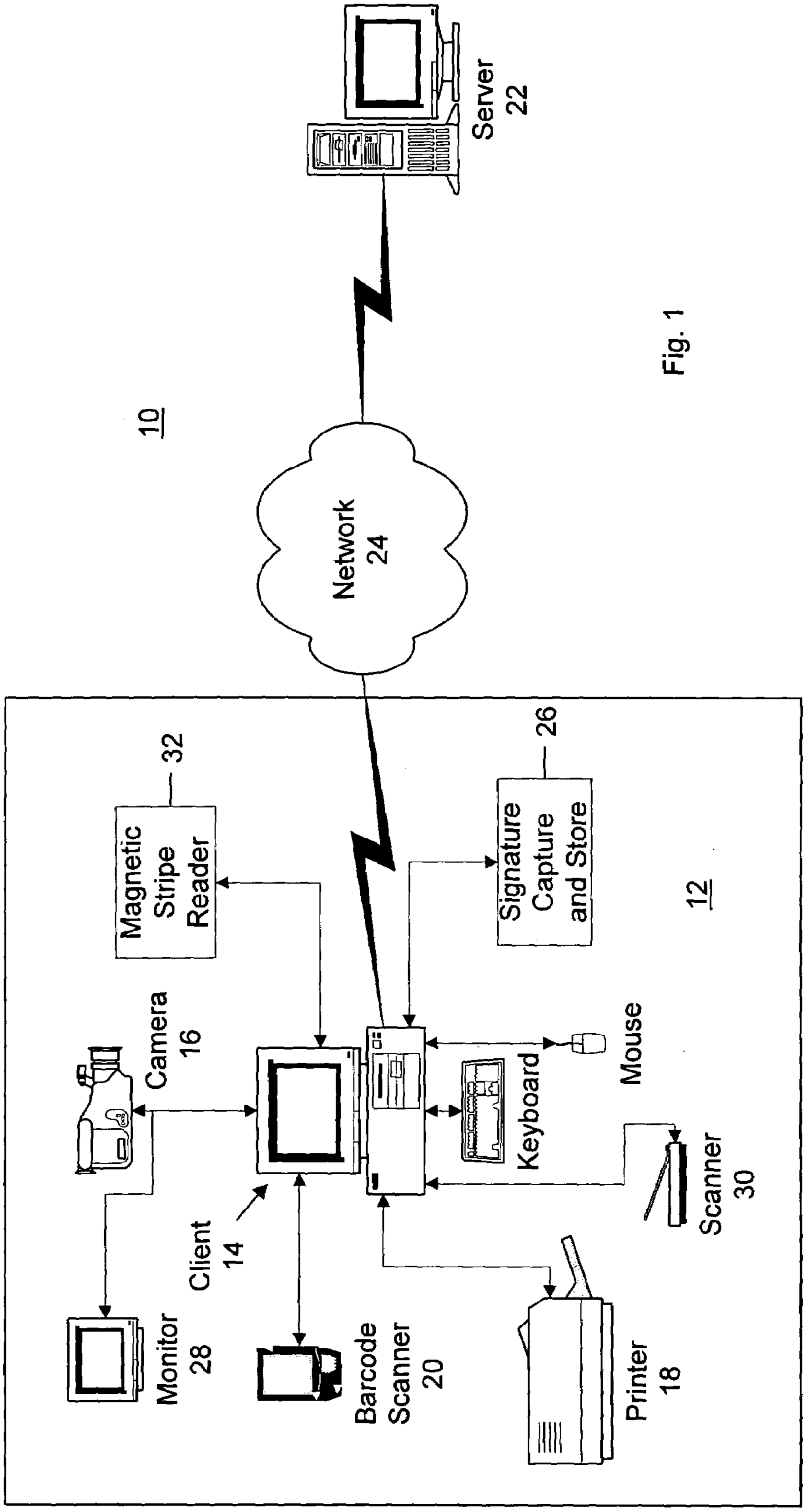
FIG. 1 is an overview of a system for monitoring access to a location using an identification card according to one embodiment of the invention.

FIG. 1 illustrates an overview of a system 10 for monitoring access to a location. The system 10 may be used at, for example, a self-serve kiosk 12. The user may use the kiosk 12 to create an identification card for gaining access to a location. The system 10 may include a client device 14 that may be used for creating an identification card. Although only one client 14 is shown, it is understood that a plurality of clients 14 may be used, the clients 14 may be situated at various locations either in the same building or the same campus, or distributed over a wide geography, etc. The client 14 may be, for example, a personal computer, laptop computer, handheld device, terminal or other device capable of creating an identification card. The client device 14 may be in communication with a camera 16. The camera 16 may be used to photograph an image of the user for placing and printing on the identification card. The camera 16 may be a digital still camera, a webcam, or other image capture device. The client device 14 may also be in communication with a printer 18. The printer 18 may be used to print the identification card created by the user. The printer 18 may be, for example, a desktop printer such as a LaserJet™, InkJet point-of-sale (POS), or other type of printer.

A scanner 20 may be in communication with the client device 14. The scanner 20 may be used to scan a barcode printed on an identification card upon a user exiting a location.

A signature capture and store device 26 may be in communication with the client device 14. The signature capture and store device 26 may be used to capture and store user signatures that are provided on an identification card. For example, an identification card may be printed with a signature box. The identification card may be inserted into the signature capture and store device 26, for example, a pressure-sensitive device. The user may use a stylus to sign the identification card. The signature capture and store device 26 may create an electronic copy of the user's signature, for example, the signature may be digitized. The digitized signature may then be stored in a storage mechanism located at the client device 14 and/or at a server 22. Additionally, the visitor may be required to sign a legal agreement printed on the visitor badge. The legal agreement, signature, and physical badge are then stored for later use should a legal dispute arise. The visitor log cross-references the physical badge to the electronic visitor entry, facilitating the retrieval of visitor information.

The client device 14 may also be in communication with the server 22 over a network 24 such as, for example, a local area network (LAN), metropolitan area network (MAN), wide area network (WAN), or the Internet. The server may be, for example, a HyperText Transfer Protocol (HTTP) server. Preferably, the client device 14 includes a display, such as a monitor, for presenting one or more graphical user interfaces (GUI) that a user may use for creating an identification card and exiting a location. A standard web browser such as Microsoft's Internet Explorer™ or Netscape's Navigator™ may be used to present the GUIs to the user on the monitor. Despite running in a web browser the GUI may be state-based and appear to the user to have the interface of a traditional computer program, which facilitates ease of use. Standard HTTP, Secure HTTP (HTTPS), or HTTP encapsulating a web service call may be transmitted using Transmission Control Protocol/Internet Protocol (TCP/IP) to communicate badge creating and access monitoring information between the client device 14 and the server 22. The system 10 may be used to create and print identification cards at the location 12. The server 22 may be used to maintain a log of user activity at the location 12 as described in further detail below. Although only one server 22 is shown, it is understood that multiple servers 22 may be used, the servers 22 may be situated at various locations, the servers 22 may communicate with a plurality of networks 24, etc. The servers 22 may also communicate in a recursive manner. For example, a client 14 may communicate with a server 22. The client 14 may request information from the server 22. If information requested is not stored on the server 22, the server 22 may communicate with one or more other servers 22 and request the information. For example, the server 22 that is communicating with the client 14 may be a server for a building of a campus of a large corporation. The server 22 may only store information related to employees of the corporation that have offices in the building. If the client 14 requests information about an employee not located in the building, the server 22 may communicate with one or more servers that store information for employees within a campus and/or the entire corporation and request the information requested by the client 14. Alternatively, the server 22 may communicate with one or more servers 22 that may not be associated with the corporation, for example, a government database server, that may store the information requested. Server 22 may be a central server in communication with a number of clients 14, thereby providing a central web server that is in communication with a number of web-based self-service identification card creation kiosks. The central server can maintain a database of all relevant information including without limitation the visitors who have created badges, their photographs, all of the information provided by the visitors, the types of identification cards created for those visitors, and the facilities which the visitors have visited and when. Additionally, if connectivity with the server is lost the client may store data locally until connectivity is restored, and transmit visitor data when the client is able to do so again.

According to one embodiment of the invention, the system 10 may also include a photograph monitor 28. The photograph monitor 28 may be used to assist users in positioning themselves in front of the camera 16 and view how they are going to be photographed. This is described in further detail below.

The system 10 may also include a scanner 30. The scanner may be used to scan, for example, photographs, business cards, standard identification cards such as driver's licenses and passports, etc. A scanned photograph may be used instead of having a user pose for a photograph. In this manner, the scanned photograph may be printed on the identification card. A scanned driver's license, passport, or business card may be used to populate one or more fields of an identification card. For example, the system 10 may include software that identifies a user's name, company name, business telephone, business address, business facsimile, etc. from a scanned driver's license, passport, business card, etc. This information may then be used to populate one or more fields of an identification card that requests such information. The scanning of photographs and business cards is described in further detail below. Additionally, the system may include functionality allowing a user to upload a photograph in advance of his visit to the server or email his photograph to the server. His photograph will then be attached to his visitor record upon their arrival.

The system 10 may also include a magnetic stripe reader 32. The magnetic stripe reader 32 may be used to obtain user information from devices that have a readable magnetic stripe, for example, a driver's license, credit card, etc. Typically cards containing magnetic stripes are swiped by the user through the card reader 32 in order for the card reader to read the data contained on the magnetic strip. Information obtained using the magnetic stripe reader 32 that is requested by the system 10 may be pre-populated into one or more corresponding fields of an identification card template (described in further detail below). Additionally, minimal information from the magnetic stripe such as the user's name may be obtained and, combined with other information such as the time of the visit, may be used to retrieve information about the user. This process, which is sometimes called winnowing, is believed to currently exist in other systems such as airport self check-in stations, but appears to have not been used in the context of front-office visitor management.

Figure 2:
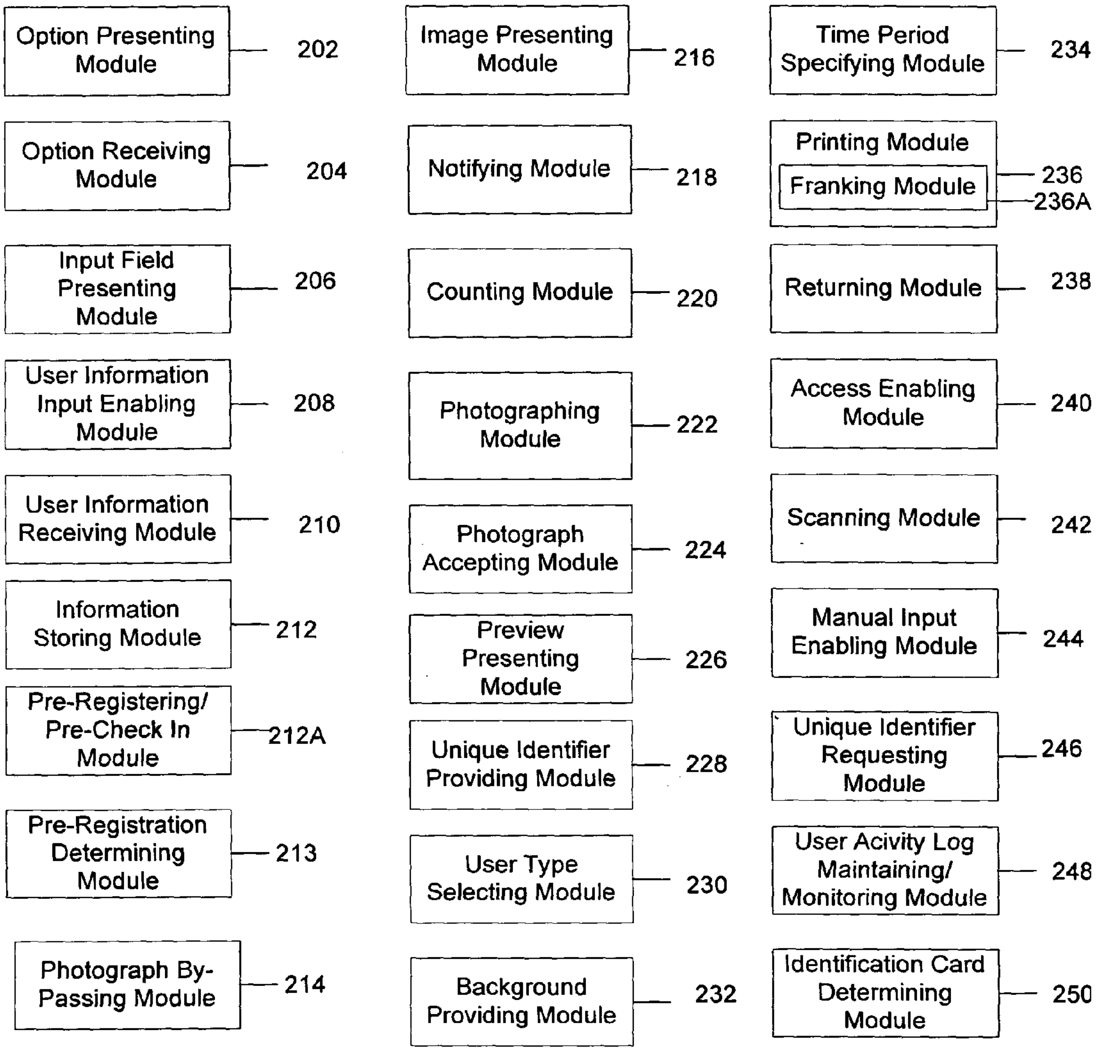
FIG. 2 is a block diagram of a system for monitoring access to a location according to one embodiment of the invention.

FIG. 2 is a block diagram of a system 200 for monitoring access to a location according to one embodiment of the invention. According to one embodiment of the invention, the system 200 may operate using Macromedia's Flash Player™. This enables a client side portion of the system 200 to be easily deployable. Additionally, by leveraging the Flash Player the invention supports a plurality of web cameras in the context of a web browser which, without Flash, would prove more difficult. Finally, Flash allows the system to display a non state-based user interface, similar to an interface for a stand-alone software application, which many users find to be easier to work with than the traditional non state-based web browser HTTP applications. This non state-based interface and the better user experience it allows is advantageous because it reduces the need for user training, decreases the amount of time a user requires to create a badge, and decreases the likelihood of error when inputting the data necessary to create a badge. Additionally, Flash contains functionality that easily supports web services and also "delta packets", which is a method that looks for the difference a user might have made to minimize the amount of data transmitted over a network. Flash is already widely deployed but a system administrator at a location may, for example, download Macromedia's Flash Player™ from Macromedia's or another's web site.

The system 200 may include an option presenting module 202. The option presenting module 202 may be used to present a user with an option for creating an identification card. An option receiving module 204 may be used to receive the option selected by the user. Upon receiving the option selected, the user may be presented with one or more user information input fields using input field presenting module 206. The fields may be constrained to specific data parameters, including but not limited to character limits, dates, verification of email addresses, and other miscellaneous limits. For example, a first name field may have a twenty (20) character limit that may prevent a user from inputting information that exceeds twenty (20) characters. The input field presenting module 206 may be used to present one or more inquiries to the user and present an input field in which the user may provide a response to the inquiries. The inquiries may be, for example, the user's first name, last name, and electronic mail (email) address, company name, purpose of visit, person visited, guest type, and other information. The information presented in each input field may be associated with a piece of information unique to each user, for example, the user's email address. A user information input enabling module 208 may be used to enable the user to input responses to the inquiries. The user may enter the responses using, for example, a conventional keyboard, touch screen, light pen, voice recognition software or other input mechanism. A user information receiving module 210 may be used to receive the user information input by the user.

The user information receiving module 210 may also be used to pre-populate one or more of the input fields depending on the user's email address. For example, a first-time visitor may input information into each of the input fields. After printing an identification card, the information provided in the input fields may be stored in, for example, a file, table, or database of a local or remote storage device such as a hard-drive of a computer used to print the identification cards or a server that is in communication with a system that is used to print the identification cards using information storing module 212. If a user is a returning visitor, that is, the user has previously had an identification card printed using a system of the invention, after the user inputs an email address, the system may search a local and/or remote storage device for a matching email address. Additionally, information may be input prior to a user's first visit in order that the user may be able to retrieve this information on his first and subsequent visits, allowing the user to input less data and leading to a higher level of data integrity, faster user throughput, and overall increase in hospitality. The information may be entered at the station by a third party, at the desk of an individual connected to the system via an Intranet, over the Internet if the system is connected to the Internet, or via a messaging and calendaring system such as Microsoft's Outlook or IBM's Lotus Notes. If the same email address is found in the storage device, information regarding one or more other input fields that is associated with that email address may be received by the user information receiving module 210 and be inserted into the corresponding input fields. The information may be received from the local and/or remote storage device. This prevents a user from having to re-enter all of the information each time the user visits a location using a system of the invention. The user information input enabling module 208 may enable the user to change any of the pre-populated input fields, for example, last name or company name, that may have changed since the user's last visit.

According to one embodiment of the invention, a group check-in option may be provided using the user information input enabling module 208. The user information input enabling module 208 may present a user with an option to perform a group check-in. A group check-in may, for example, enable one user among a group of users (e.g., five (5)) to enter all requested information into the input fields a single time and then use that information to print a plurality of identification cards. The user may select a group check-in option that presents the user with a modified user information screen that requests only the incremental information needed for additional users, for example first and last name. General information entered by the user, for example, company name, purpose of visit, etc., may be replicated for other users in the group. In this manner, the additional users may not need to enter all of the information typically requested of users and provide only personal information such as, for example, first name and last name. Alternatively, the information entered by one user may be all of the information requested for the other users in the group. For example, the one user may also enter the first and last names of the other users in the group. Therefore, after the one user has insert the requested information for each of the users in the group, none of the remaining users in the group may be required to enter any information. The system 200 may create individual identification cards for the other users based on the information provided by one user. According to one embodiment, a photograph obtaining portion of the system 200 (described in further detail below) may be by-passed when a group check-in option is selected or the system may prompt the users to have their photographs taken one at a time.

If a group check-in option has been selected and performed, the system 200 may use a batch-type printing process to print the identification cards for each of the users in the group. After one or more of the users has entered the information requested and the identification cards are ready to be printed, the system 200 may print identification cards for each of the users without requiring each user to request an identification card separately. The system 200 may use the information entered by the one user or additional users if more than one user entered each user's personal information to create and print identification cards for each of the users in the group. This reduces an amount of time needed to create and print identification cards for each user of a group.

According to another embodiment of the invention, the system 200 may enable users to pre-register using pre-registration/pre-check-in module 212A. For example, the pre-registration/pre-check-in module 212A may provide an application that enables a user, such as a meeting organizer, to input information about a meeting participant. This application may reside on an Intranet or it may be part of an enterprise messaging and calendaring system, such as Microsoft's Outlook or IBM's Lotus Notes. If the meeting organizer schedules a company meeting in which one or more meeting participants are persons are not employed by the company, the meeting organizer or other system user may enter known information about that meeting participant that may be required for creating an identification card. The meeting organizer may access the system 200 using the user information input enabling module 208. The meeting organizer may input, for example, the meeting participant's first and last name, purpose of visit, date of visit, person visited, and/or any other information that may be required by the system 200 for a person visiting on a particular day. When the meeting participant arrives, the user may access the system 200 as described above and simply enter any additional information not entered by the meeting organizer. This reduces an amount of time needed by the meeting participant to create an identification card using the system 200. If a photograph of the visitor is already stored in the system a visitor badge may be printed prior to the visitor's arrival. When the visitor arrives he merely needs to indicate his arrival to the system by picking up his name badge and scanning its bar code. This greatly reduces the time needed to check a visitor in while simultaneously increasing the accuracy of the visitor information.

If the meeting organizer enters all required information for the meeting participant, the meeting organizer may request that the identification card be printed substantially immediately or at some time prior to a start of the meeting. In this manner, the meeting participant may simply retrieve the identification card upon arrival at a location where the meeting may be being held.

According to one embodiment, the system 200 may be integrated with a scheduling/calendaring application such as, for example, Lotus Notes™, Microsoft Outlook™, etc. If a meeting organizer schedules a meeting using a scheduling/calendaring application, the pre-registration/pre-check-in module 212A of the system may pre-register one or more meeting participants that may require an identification card to attend the meeting. The pre-registration/pre-check-in module 212A may use any known information about the meeting participant to pre-register the meeting participant. For example, the pre-registration/pre-check-in module 212A may use a name of the meeting participant that may be included in an invitation that may be forwarded to the meeting participant via, for example, electronic mail, chat, etc., to attend the meeting. Additionally, the system may email a confirmation code to individual visitors which can be used upon arrival to retrieve their visit and/or visitor information and begin their meetings.

According to one embodiment, the system 200 may enable the meeting participant to pre-register using, for example, a website. The meeting organizer may provide the meeting participant with a password that enables the meeting participant to access the website. Using the website, the meeting participant may access the system 200 using the pre-registration/pre-check-in module 212A. The user information input enabling module 208 may enable the meeting participant to enter user information. The meeting participant or other authorized user may enter any known information requested by the system 200. If the meeting participant enters all required information, the system 200 may enable the meeting participant to request that an identification card be printed. Printing the identification card is described in further detail below. Using a website to pre-register into a visitor management system has been previously implemented in other visitor management systems. However, using Flash to create a non state-based, fully-interactive web application for pre-registration is believed to be novel. Creating a non state-based, fully interactive pre-registration module has several substantive advantages surrounding ease of use. Specifically, because the application is inherently easier to use the chance of error is significantly decreased and the invention brings enhanced utility in the form of accuracy and reduced data entry and maintenance times.

According to another embodiment of the invention, the system 200 may enable the meeting participant or other user to check-in and/or pre-print an identification card using the pre-registration/pre-check-in module 212A. For example, the user may call a toll-free number or use a personal digital assistant (PDA), radio frequency identification (RF-ID), biometric devices, etc. to check-in and/or pre-print an identification card. This type of check-in may require that a user's information be stored by the system 200 as described above. According to one embodiment, the user may call a toll-free number associated with the system 200. The system 200 may identify the user by the user's stored telephone number using, for example, caller identification. The system 200 may use the user information receiving module 210 to receive user information about the user using the information storing module to pre-populate a visitor badge, which may then be pre-printed and scanned to quickly allow the visitor access to a venue 212. The system 200 may determine if that user is pre-registered using a pre-registration determining module 213. If a determination is made that user has pre-registered, the system 200 may print an identification card for that user. Additionally, the system 200 may use an integrated scheduling/calendaring application such as Lotus Notes™ or Microsoft Outlook™ to notify the meeting organizer or other user(s) that a meeting participant has pre-checked-in or checked in by, for example, transmitting an electronic mail message or chat message to the meeting organizer.

Integration with an application such as Lotus Notes™ or Microsoft Outlook™ may also enable a user to import the user's contacts or address book into the system 200. This may be used to facilitate an identification card creating process. For example, the user information input enabling module 208 may be used to import a user's contacts or address book. Therefore, when a user whose information has been imported into the system 200 creates an identification card, one or more of the fields requesting information may be pre-populated based on information imported from the user's contacts or address book. Conversely, the user information input enabling module 208 may be used to update a user's contacts or address book based on information input by a user of the system 200. For example, if a user creates an identification card using the system 200, the system 200 may request a name of a person that user is visiting. The user information input enabling module 208 may determine whether the user is listed in the person's contacts and/or address book. If so, the person's contacts and/or address book may be updated or a new contact or entry may be created for the user. According to one embodiment, the user information input enabling module 208 may update user information in a company mailing list in addition to or in lieu of a person's contacts and/or address book.

The user information input enabling module 208 may also be used to initiate a preferred identification card creating process based on a user. For example, the information storing module 212 may store a list of priority users. The priority users may be, for example, users that frequently visit a particular location, senior management, etc. The priority users may be required to undergo a specialized identification card creating process. The specialized identification card creating process may be a simplified version of a complete identification card creating process. The priority users may not be required to input as much information as non-priority users, thus facilitating the identification card creating process. Additionally, this process may be abstracted such that profiles may be assigned to individual users and attached to specific business rules. For example, under the preferred visitor scenario one profile may be "VIP" and the visitor is required to enter less information; another profile may be "Delivery person" which invokes a different series of rules. The number of profiles is nearly limitless, allowing users of the system to customize it to their specific needs.

A user may also use a PDA or a radio frequency identifier to check-in. The pre-registration/pre-check-in module 212A may communicate with the PDA or RF-ID to identify the user. For example, the user may use the PDA to transmit an electronic copy of the user's business card to the pre-registration/pre-check-in module 212A. The user may be identified by information provided in the electronic copy of the user's business card. Alternatively, the user may be provided with a device that includes an RF-ID. The RF-ID may transmit a signal to the pre-registration/pre-check-in module 212A that enables the system to identify the user. The system 200 may then print an identification card for the user. Finally, a smaller version of the client software may run on a PDA and be connected to the server via wireless networking technology such as those technologies defined by the IEEE 802.11 networking specification. This small version could run on either a PDA that is temporarily loaned to a visitor to make a visitor badge, a PDA that is used by an attendant to create a visitor badge, or an individual visitor's PDA. In this last example the visitor may be prompted to enter a specific uniform resource locator which may retrieve one or more screens that may prompt the visitor for the information required to create a visitor name badge.

Biometric devices may also be used to identify the user. The biometric devices may include, for example, fingerprint scanning, retina scanning, facial recognition, etc. One or more biometric devices may be provided at a location where an identification card is needed to enter. The biometric devices may communicate with the pre-registration/pre-check-in module 212A of the system 200. If the user is identified using the biometric device, the system 200 may print an identification card for the user. The biometric devices may be used to scan a biometric feature such as a fingerprint, and use a mathematical hashing algorithm to transform the fingerprint into an alphanumeric code that is unique to that user. The hash algorithm may be a one-way hash such that a person studying the stored code would not be able to extract the biometric identifier from which it was derived. Not storing real biometric data may alleviate end user privacy concerns and prompt users to voluntarily use biometric input devices which increases speed while decreasing fraud.

The system 200 may obtain a photograph of the user that may be printed on the identification card. Alternatively, the system 200 may enable, for example, a system administrator to bypass photographing the user using photograph bypassing module 214. The photograph bypassing module 214 may be used as a toggle switch to activate and de-activate a photographing portion of the system 200. Alternatively, an individual template which does not contain a photograph would not prompt a user to take a photograph. For example, the photograph bypassing module 214 may enable a system administrator to enter a keystroke combination that de-activates (or activates depending on a given state of the photograph bypassing module 214) a photograph obtaining portion of the system 200. The keystroke combination may be entered locally at system 200 or from a remote location that is in communication with the system 200. By enabling the photograph obtaining portion of system 200 to be by-passed, this may decrease an amount of time needed to print an identification card. According to one embodiment of the invention, an icon may be presented in a system welcome screen (described in further detail below) that indicates whether the photograph bypassing module is active or de-active. The system administrator may select other options within a card layout function to determine a selection and arrangement of identification card indicia that will be printed on the card, as well as other indicia such as a company logo or a security code. The system also may include a system administrator field function that allows a system administrator to determine the selection and number of data fields which must be completed by a user before an identification card will be printed for the user.

If the photograph bypassing module 214 is not active, an image presenting module 216 may be used to present an image of the user to the user. The image presenting module 216 may be used to present a real-time image of the user that is to be photographed and printed on the identification card. The image presenting module 216 may also be used to request that the user select an option that a photograph of the user be taken.

The image presenting module 216 may also be used to assist users in positioning themselves for having a photograph taken. The image presenting module 216 may be in communication with a photograph monitor. The image presenting module 216 may present the users with an image of themselves. The image may include a matte background indicating where the users should be positioned for obtaining a photograph. The matte background may include an opaque area that is an outline of a head and shoulders of a person. This indicates to the users where they should be positioned when the photograph is taken. For example, the users may position themselves in front of a camera and be presented with an image of themselves on the photograph monitor. The system 200 may indicate to the users that the users should position themselves in front of the camera such that an outline of their head and shoulders substantially matches the outline of the head and shoulders presented in the image. After positioning themselves such that the outline for their head and shoulders substantially matches the outline of the head and shoulders in the image, a preferred photograph may be taken.

Upon selecting the photograph option, a notifying module 218 may be used to notify the user regarding when a photograph is to be taken. This enables the user to obtain a desired image to be photographed. The notifying module 218 may use an audible signal and/or a visual display that notifies the user when the photograph is to be taken. The audible signal may be, for example, a tone or other sound and the visual display may be, for example, a timer. A counting module 220 may be used to present the timer to the user. The timer may count down from a time of, for example, three seconds before the photograph is to be taken.

A photographing module 222 may be used to photograph the image of the user presented by the image presenting module 216. After the photograph has been taken, a photograph accepting module 224 may be used to enable the user to accept or reject the photograph. If the user rejects the photograph, the user may be presented with another image for which a photograph may be taken. If, however, the user accepts the photograph, a preview presenting module 226 may be used to present a preview of the identification card to be printed. The preview preferably presents the identification card on a print media onto which the identification card is to printed. Additionally, the preview may present the identification card in a layout as the identification card is to be printed. For example, the preview may present the identification card on a portrait, landscape, circular, or other layout depending on a type of print media that is to be used to print the identification card. The preview may allows the user to see the information as it is entered, such as after each letter of the person's name, company, or other information is entered by the users. The purpose of the preview is to decrease the risk of finding an error after printing a badge as well as to increase the level of hospitality by managing users' expectations about what their badges will look like.

According to one embodiment of the invention, the photographing module 222 may enable a wide photograph of a user to be taken regardless of a particular position of the user, provided the user is positioned in an area substantially in front of a camera used to take the photograph. The photographing module 222 may include mechanisms that recognize facial elements and compute natural boundaries of a user's head and possibly other portions of the user's body. The photographing module 222 may then crop a photograph taken of the user such that a passport-type photograph or any other type of photograph remains.

According to another embodiment of the invention, the photographing module 222 may include facial recognition technology that may be used with cameras that automatically pan and zoom to automate the photographing process. This is provided that the user is positioned, for example, either standing or sitting, in an area substantially in front of the camera.

Alternatively, the photographing module 222 may be used for importing a scanned photograph to be printed on an identification card. The photographing module 222 may be in communication with a scanner. A user may use the scanner to scan a photograph that is desired by the user to be printed on an identification card. For example, the user may scan a photograph from a driver's license or passport. The user may also use stand-alone photographs. The photographs may be scanned using photographing module 222 and imported such that the photograph may be printed on the identification card.

Alternatively, a photograph may be stored in the system prior to a visit via an Intranet module or enterprise messaging and calendaring system, such as Microsoft's Outlook or IBM's Lotus Notes, then retrieved once the visitor arrives.

The identification card may be printed on various identification card media. Examples of such media are disclosed in U.S. patent application Ser. No. 10/641,132, filed Aug. 14, 2003 which is incorporated by reference herein. The identification card media may be a sheet of paper label stock of less than full size 8½×11 inches or A4 paper. The label stock sheet may itself form the identification card, or the identification card may be defined within the label stock sheet by at least one boundary formed therein. For example, a single-sided identification badge may be defined within the media sheet by a single die-cut boundary, enabling a user to remove the identification card after it has been printed. A two-sided identification card may be defined within the media sheet by boundaries defined by die cuts, with the two sides of the identification card being separated by a weakened fold line such as a perforation line or a score line. The media may be printed upon by a single pass through the printer, with the identification card thereafter peeled away from the remainder of the media and folded along the fold line to form a two-sided identification card. The software which controls the printer includes the boundary information necessary for printing the identification card within the predefined identification card boundary or boundaries formed in the identification card media.

The preview of the identification card as well as the printed identification card may be based on a pre-defined identification card template stored, for example, at a client device. According to one embodiment of the invention, an appearance of the identification card presented using the pre-defined template may only be altered by, for example, a system administrator. Although the templates may be stored at a client device, formatting of the templates may be performed by, for example, a system administrator on a server side of the system. The client device may then, for example, download the templates from the server and store the templates locally. This enables the system to run, if desired, completely on a client side of the system because the client system uses a plug-in, for example, Macromedia's Flash Player™. Preferably, the system does not offer a user the capability of altering an appearance of the identification card. Client devices may periodically check with the server to see whether the system administrator has indicated the client devices must switch to a different template then, upon noticing a change has been requested, begin to use the new template.

According to one embodiment of the invention, the system may use a dynamic template for creating an identification card. The dynamic template may be a specialized data storage mechanism that combines logic and stored information into a single file. The dynamic template preferably includes a self-contained collection of fields, including the prompts and possibly other user screen display elements presented to a user and the logic needed to validate the fields, data types expected from a user, workflow rules needed to navigate among the fields, validation logic for validating data entered by the user, an area for receiving information needed to populate the fields, database mapping instructions for storing the data received from the user into a database for later retrieval, and a printing component to print the fields including the textual data and any graphical data such as the visitor's photograph. The printing component preferably indicates a formatting for an identification card such as, for example, margins, font, font size, sheet size, etc. The printing component thus contains formatting instructions for printing data obtained from the user in response to the prompts within a predefined boundary onto the identification card media to create the identification card. The template may be implemented as a self-contained executable computer program capable of being executed within the context of a parent computer program. The template may also contain logic for asking only information that is required. The information required can be determined from the previously input information. For example, if the visitor is a contractor the system may require less information from the visitor than if the visitor were a purported vendor. Thus, the prompts presented to the user may be determined by the responses to previous prompts. All of these rules may be contained within the dynamic template. One type of dynamic template that may be used is described in commonly owned, co-pending U.S. patent application Ser. No. 09/912,188, filed Jul. 24, 2001, all of which is incorporated herein by reference.

The dynamic template may use, for example, the input field presenting module 206, to enable a system administrator to customize a template to be used for creating an identification card. For example, the input field presenting module 206 may enable the system administrator to select which fields and/or text is presented to a user through a series of graphical user interfaces. Depending on which fields are selected the system administrator may, for example, customize an identification card designed more for hospitality and less for security, or visa versa. Alternatively, the system administrator may select all or a plurality of fields and indicate the fields as mandatory or optional. For example, if the system administrator desires a high-security identification card for use in a government military facility, the system administrator may select a plurality of fields that request a multitude of information from a user. For example, the system administrator may desire that the user enter personal and vehicle information and obtain a photograph of the user, or even require the user to enter his badge data while still in his car and obtain a photograph of the user and his automobile, including the license plate. The personal information is defined in the dynamic template and may include many types of data. Some examples of information that is commonly collected include first name, last name, company name, person visited, etc. The vehicle information may include, for example, make, model, year, and license plate number of the vehicle in which the user arrived. The name and other identifying information provided by the user can be checked to ensure that the visitor is an authorized entrant to the facility by comparing the identifying information to a list of authorized entrants. Thus, only visitors who are expected and pre-authorized will be allowed to create badges, or only visitors who are expected and pre-authorized will be allowed to create badges without passing additional security steps.

The dynamic templates may be used with a variety of mechanisms. For example, the dynamic templates may be used with a screen presenting mechanism. The screen presenting mechanism may be used to process the prompts, logic, data types, and workflow stored in the dynamic templates. The screen presenting mechanism may use the information provided in the dynamic templates to render one or more screens containing the prompts that may be presented to the user. The screen presenting mechanism may also collect data input by the user.

The dynamic templates may also be used with a printing mechanism. The printing mechanism may read the dynamic templates and convert the dynamic templates into printable output. Preferably, the printing mechanism prints the dynamic templates regardless of how a user inputs information into the dynamic template.

A logging mechanism may also be used with the dynamic template. The dynamic templates contain embedded workflow, which causes events to be transmitted to the central server and aggregated into one or more central logs. Some specific embodiments of these logs include but are not limited to a traditional HTTP access file, a database attached to a traditional business middleware engine, and a database attached to a transaction control engine. The logs may summarize the data transmitted by the dynamic template for later analysis. Preferably the data is logged in an aggregate manner. This enables the data to be queried using conventional query tools and/or read by other devices.

According to one embodiment, the information entered by the user may be checked against information stored in, for example, a government database that stores such information. This may produce a higher-security identification card because the user may be required to enter a greater amount of verifiable information before an identification card may be created and printed. A higher-security identification card, however, may require a longer period of time to create and/or print. According to another embodiment, the system may calculate an approximate amount of time that may be required to create and/or print an identification card that includes the fields selected by the system administrator. The time to create and/or print the identification card may be provided to the system administrator allowing the system administrator to instantly see the tradeoff between higher security and slower processing times.

If the system administrator desires a low-security identification card for use in, for example, a visitor center, that does not require an extended period of time to create and/or print, the system administrator may select only the fields that request information desired to be entered by the user. For example, the system administrator may customize a dynamic template that requests only a user's first and last name. In this manner, although the system may be able to, for example, obtain a photograph of a user, the dynamic template may be used to bypass a photograph obtaining process because a photograph field is not included in the dynamic template. According to one embodiment, the system may enable a system administrator to create one or more field modules. The input field presenting module 206 created by the system administrator may then be used by the system to create future identification cards. For example, a system administrator may create a field that requests a user to enter his/her mother's maiden name. This field may then be used when selected by the system administrator for use in a dynamic template.

The system may enable the system administrator to create a plurality of dynamic templates. For example, the system administrator may create dynamic templates having a varying degree of security. Therefore, the system administrator may select when a particular dynamic template may be used, for example, if a facility is under a terrorist alert, a very-high security dynamic template may be used. The system administrator may also indicate which templates are to be used for particular visitors. For example, users that are visiting a senior official of a corporation may be required to create an identification card using a high security dynamic template. The dynamic templates may be stored in, for example, a central storage mechanism. The system may retrieve a particular dynamic template based on a dynamic template designated to be used, for example, on a particular day, for a particular visitor, for standard use, etc. One of the attributes commonly contained in a dynamic template is the length of time for which the visitor badge created by the template remains valid. For example, a standard visitor badge commonly expires the same day it was created whereas a visitor badge for a contractor may remain valid for several days. Once a badge becomes invalid because it has electronically expired the system will note to a system administrator that the badge is invalid when the visitor tries to log into a building. This functionality is referred to as electronic timeout badges.

The templates, either dynamic or static, may be mirrored templates or otherwise enable two-sided printing of an identification card. In this manner, identification card information may be printed on both sides of a substantially centered score, perforation, clean edge (described in further detail below) or line on a print media on which the identification card information is to be printed. Therefore, after an identification card is printed, the print media on which the identification card is printed may be folded along the centered score or line such that the identification card information is provided on two opposite sides of the identification card. This increases a likelihood that while a user is wearing the identification card, the identification card information may be visible. This may be useful for identification cards that are, for example, attached to a chain that is to be placed around a user's neck. As the user is walking, the identification card may flip over. By having the identification card information printed on opposite sides of the identification card, the identification card information may remain visible. Preferably, two-sided printing is indicated by a template, therefore, a user need not select two-sided printing. Two-sided printing may be selected by a system user when selecting a predefined template or customizing a template. Alternatively, the two-sided printing may be used to print, for example, a company mission statement, logo, policy, slogan, or other information display.

According to one embodiment of the invention, the identification card may be printed with an attached portion. The attached portion may be removable. The attached portion may be, for example, a label or coupon that may be used at a food establishment provided at the location. The attached portion may be removed, for example, along a perforation provided on the identification card, by peeling off one side of the identification card, or other manner using print media described in further detail below. The attached portion may also be, for example, a Non-Disclosure Agreement that a user may be required to sign to gain access to a location.

The preview presenting module 226 may be used to present the user information input by the user and the photograph as it is going to be printed on the identification card. The preview presenting module 226 may be used to present the preview of the identification card in real-time. For example, as the user inputs responses to the inquiries presented by input field presenting module 206, that user information may be presented in the preview of the identification card as it is going to be printed while the user inputs the information. Additionally, the user may be presented with a real-time image that is going to be photographed by the photographing module 222. The photograph printed on the identification card may stored with the user information provided in the input fields by the user using the information storing module 212. The photograph may be associated with a user by unique identifiers linked to the users profile in the database including, for example, the user's email address as described above. Therefore, a stored photograph of the user may be used as the photograph for the user's identification card. The user, however, may have an opportunity to accept the photograph or re-take a photograph using the photograph accepting module 224 as described above. Additionally, the photographs in the system may be repurposed for alternate uses by the system administrator or server owner with appropriate permissions for such purposes as meeting notes, face books, or other solutions that require a photograph.

A unique identifier module 228 may be used to provide the identification card with at least one unique identifier. The unique identifier may be, for example, a barcode and/or a unique identification number. The unique identification number may be a universal serial number. Preferably, each identification card is printed with a unique serial number. According to one embodiment, identification cards may be distributed that have pre-printed serial numbers. The pre-printed serial numbers may be associated with, for example, a particular system and used for tracking purposes. For example, a system administrator may purchase a collection of pre-printed identification cards. The pre-printed identification cards may correspond to a given set of unique serial numbers. The system administrator may enter the first serial number for the set of unique serial numbers. The system may then track which identification card is printed with that serial number. Similarly, each subsequent identification card that is printed may be printed with a serial number that may be tracked by the system. For example, the system may determine when a user having that identification card signed-in to and signed-out of a particular location. According to one embodiment, the serial numbers are pre-printed holograms. Another embodiment employs a unique identification number obtained when each individual server is installed and unique identifiers being serialized numbers appended to the unique server identifier. Another embodiment employs a unique hash algorithm used to create a finite set of identifiers that are unique to an individual system, and those numbers being used as the unique identifiers printed on the visitor badges. The benefit of this latter approach is higher security because it is difficult to guess which future serial numbers are valid when attempting to produce a counterfeit card. These serial numbers are affixed to the cards when they are produced, for example using either via two or three dimensional barcodes, encoded onto permanent or temporary magnetic stripes, and/or written out in human readable form.

The preview presenting module 226 may be used to present the barcode and unique identification number on the preview of the identification card as it is going to be printed on the identification card.

A user type selecting module 230 may be used to enable the user to select a user type. The user type selecting module 230 may be used to present the user with a plurality of user type options. The user type options may be, for example, employee, contractor, and visitor. The user types may be presented, for example, in a pull-down menu, located adjacent radio buttons for selection using, for example, a conventional keyboard or computer mouse or other selection mechanism. A background for the photograph to be taken may be provided using background providing module 232. The background may vary depending on, for example, the day of the week or the user type selected. Each user type may have a particular background associated therewith. For example, a contractor user type may have a background of a particular color, pattern, design or other feature. Alternatively, identification cards printed on particular days of the week may have a particular photograph background. For example, photograph backgrounds for identification cards printed on Mondays, Wednesdays, and Fridays may be blue, red, and black, respectively. According to one embodiment, the system 200 may enable a system administrator to import a design desired to be printed on the identification card. This may be done using, for example, background providing module 232. Alternatively, the system may use fractal algorithms to generate unique visual identifiers that vary from day to day and which would be difficult to replicate by a counterfeiter. These fractal patterns may be combined with the more obvious color identifiers to increase the security of the system.

A time period specifying module 234 may be used to specify a time period for which the identification card is valid. The time period may be based on a user type selected. For example, a guest user type may result in an identification card being valid for a maximum of one day. A contractor user type, however, may enable the user to specify a time period for when the identification card is valid. The maximum time period that may be specified for which the identification card is valid may be, for example, a period of up to two weeks. An employee user type identification card is valid for a period of one year. Time period information may be attached to a dynamic template.

After providing the identification card with all required information, a printing module 236 may be used to print the identification card as shown in the preview. An appearance of the identification card printed may be based on a pre-defined identification card template stored, for example, at a client device. According to one embodiment of the invention, an appearance of the identification card presented using the pre-defined template may only be altered by, for example, a system administrator. Preferably, the system does not offer a user the capability of altering an appearance of the identification card. The printing module 236 may also enable the user to re-print the identification card if, for example, the user experiences difficulty in printing the identification card.

The printing module 236 may use a hash function to print the identification card. By using a hash function, the printing module 236 may not reformat the identification card and simply print the identification card in a format in which the identification card is stored. This enables the printing module 236 to print the identification card in a variety of formats such as, for example, graphics interchange format (GIF), tagged image file format (TIFF), joint photographics expert group (JPEG) or other format. The printing module may, however, scale down an image to be printed, for example. The printing module 236 preferably supports printing the identification cards on a variety of print media as described in further detail below. The printing module may print to a printer that is attached to the client computer or part of a network attached to the client computer via a plurality of networking options.

According to one embodiment of the invention, the printing module 236 may include a franking module 236A that enables a user to frank checks. The franking module 236A may be used with point-of-sale (POS) InkJet printers. This enables a user to overprint a signature on, for example, a check, that makes it difficult to alter the signature. The franking module 236A may be any known franking mechanism used in POS systems. One embodiment uses a high-speed inkjet printer intended for POS that may be used by the system for the creation of color visitor name badges, it is believed that no visitor management solution targets or uses high speed POS inkjet printers.

A returning module 238 may be used to enable the user to, for example, return to a previous display or return to an initial screen that a user encountered upon using the system 200. If the user has printed the identification card and does not desire to return to a previous display, access enabling module 240 may be used to enable the user to access the location for which the identification card was printed. This may include scanning the identification card at one or more entry points in the location. A scanning module 242 may be used to scan a barcode or other unique identifier printed on the identification card. The scanning module 242 may be used to maintain a record of when a user has exited the location. For example, on exiting the location, a user may access the system 200 and place the barcode of the identification card beneath a scanner. The scanning module 240 may scan the barcode and recognize that the user has exited the location based on, for example, a location of the barcode scanner. If the scanning module 240 does not recognize the barcode or if the user has difficulty scanning the barcode, a manual input enabling module 244 may be used to enable the user to input a unique identifier, such as a unique identification number, to exit the location. A unique identifier requesting module 246 may be used to request that the user input the unique identification number printed on the identification card. The unique identifier requesting module 246 may present the user with an input field into which the user may input the unique identification number. If the unique identifier requesting module 246 recognizes the unique identification number, the user may be signed out of the system 200. If the unique identification number is not recognized, the unique identifier requesting module 246 may request that the user re-input the unique identification number. This process may be repeated until the unique identification number is recognized, the barcode is properly scanned, or it is determined that the user's identification number is invalid. If the user's identification number is invalid the system issues a audible and/or visual alert, writes a log entry, and may also notify an attendant via predefined business rules that may include such workflow items as sending an email, paging an individual, or other similar workflow criteria.

A user activity log maintaining/monitoring module 248 may be used to maintain and monitor a log of user activity regarding ingress and egress of the user at the location. The user activity log may be maintained, for example, at a server remotely located from the location but that is in communication with system equipment located at the location. Alternatively, the server may be located at the location. The user activity log maintaining/monitoring module 248 may also be used to create a temporary user activity log that may be stored at the client. In this manner, the client may not necessarily communicate with a server to obtain information provided in the log. Preferably, the log file is maintained in a relationship database management system (RDBMS) that may be linked to and queried from other areas of the present invention as well as via other mechanisms. Storing the data in an RDBMS allows the information to be cross-integrated into other enterprise systems, for example Enterprise Access Control (EAC), Enterprise Resource Planning (ERP), Customer Relationship Management (CRM), Human Resources (HR), etc.

According to one embodiment, the log maintaining/monitoring module 248 may be used to monitor the log file. The log maintaining/monitoring module 248 may monitor the log file for, for example, specific users, frequent visits by a user, peculiar check-in and/or check-out times, or other unusual or repetitive occurrences. Upon an occurrence of a predetermined event, the log maintaining/monitoring module 248 may cause the system 200 to perform a predetermined action. For example, if a predetermined change is made to the log file, the system 200 may arrange an event that a vendor of a third party access control system may use to initiate a portion of a workflow associated with the third party's access control system that allows access to a new user. The log maintaining/monitoring module 248 may alert, for example, a system administrator, when a predetermined event has occurred. The alert may be transmitted via, for example, electronic mail, chat, facsimile, phone call, etc.

The log maintaining/monitoring module 248 may also be used to create a hard-copy of the log file at a particular time or export the log file to, for example, a personal digital assistant (PDA) or server. For example, a system administrator may desire a record of all users that are checked-in to the system 200 at a particular time. This may be, for example, if a fire alarm sounds at the location and all users must exit the location. The log maintaining/monitoring module 248 may enable the system administrator to request that the log file be printed at a predetermined printer, exported to a PDA or server, emailed to a remote email reading device, sent to an instant messenger client, or any other mechanism that quickly transfers the data from the system to a different system where it may be retrieved. This may be, for example, a panic button that the system administrator may select to print and/or export the log file. Activation of the panic button may result in a hard copy being created of a list of every visitor or other badge recipient who is currently in the facility or facilities. The system may also initiate an electronic copy of such a list being sent to an emergency governmental entity such as the local police or fire department.

The system may also generate refill reminders based on traffic. The system administrator may enter into the system an initial number of identification card media sheets available in inventory. The system keeps track of how many badges are printed, and subtracts the number of printed badges from the available inventory. When the available inventory reaches a predetermined minimum, the system can generate an appropriate message such as a message to refill the badge media inventory at a particular entrance to a particular facility, or to reorder more badge media from a supplier. One embodiment of this functionality might be a mechanism that transparently contacts a visitor badge reseller and electronically places an order for more badges.

Additionally, the system 200 may also include a common Application Programming Interface (API) that may enable third party products to initiate a workflow portion of an identification card creating process. For example, the user may use a biometric device such as a thumbprint scanner to check-in to the system 200. In the foregoing example, the thumbprint scanner may use a mechanism that translates the user's thumbprint into a unique serial number. The system 200 may determine that user information associated with that thumbprint is being stored by the system 200. The system 200 may then retrieve that user information and pre-populate any fields requesting user information that was stored. The biometric identifier may also be a retina scan, facial geometry analysis, gait analysis, or any other number of biometric indicators.

According to one embodiment of the invention, the system 200 may include an identification card determining module 250. The identification card determining module 250 may assist, for example, a system administrator, in creating an identification card that may be most suitable for a location(s) in which the identification card is to be used. The identification card determining module 250 may present the system administrator with an interactive questionnaire. The questionnaire may present the system administrator with a series of questions that may enable the system 200 to recommend a identification card that may be the most appropriate for use at one or more locations and that accounts for a type of work being performed at and occupants of that location. For example, the questionnaire may request information regarding a type of work performed at one or more locations in which the identification card is to be used, whether high-ranking government or other officials may be present at the location, the types of visitors that visit the location, etc. Based on information provided by the system administrator in response to the questionnaire, the identification card determining module 250 may recommend a predetermined template to be used for creating the identification cards to be used by the system at one or more locations. The identification card determining module 250 may recommend one or more desired input fields, whether a photograph of a user should be taken, etc. and enable the system administrator to mark the input fields as optional, mandatory, or un-included. Depending on the input fields selected by the system administrator, the identification card determining module 250 may provide a security rating for the identification. The security rating may be, for example, a rating of low, medium, high or very high. The security rating may also be a number rating, for example, a number between one (1) and ten (10) with ten (10) being the highest security rating.

The identification card determining module 250 may also indicate to the system administrator approximately how much time a user will need to create an identification card using the recommended template or a customized template created by the system administrator. The identification card determining module 250 may also indicate an approximate print time and ink or toner usage for a particular identification card.

Figure 3A:
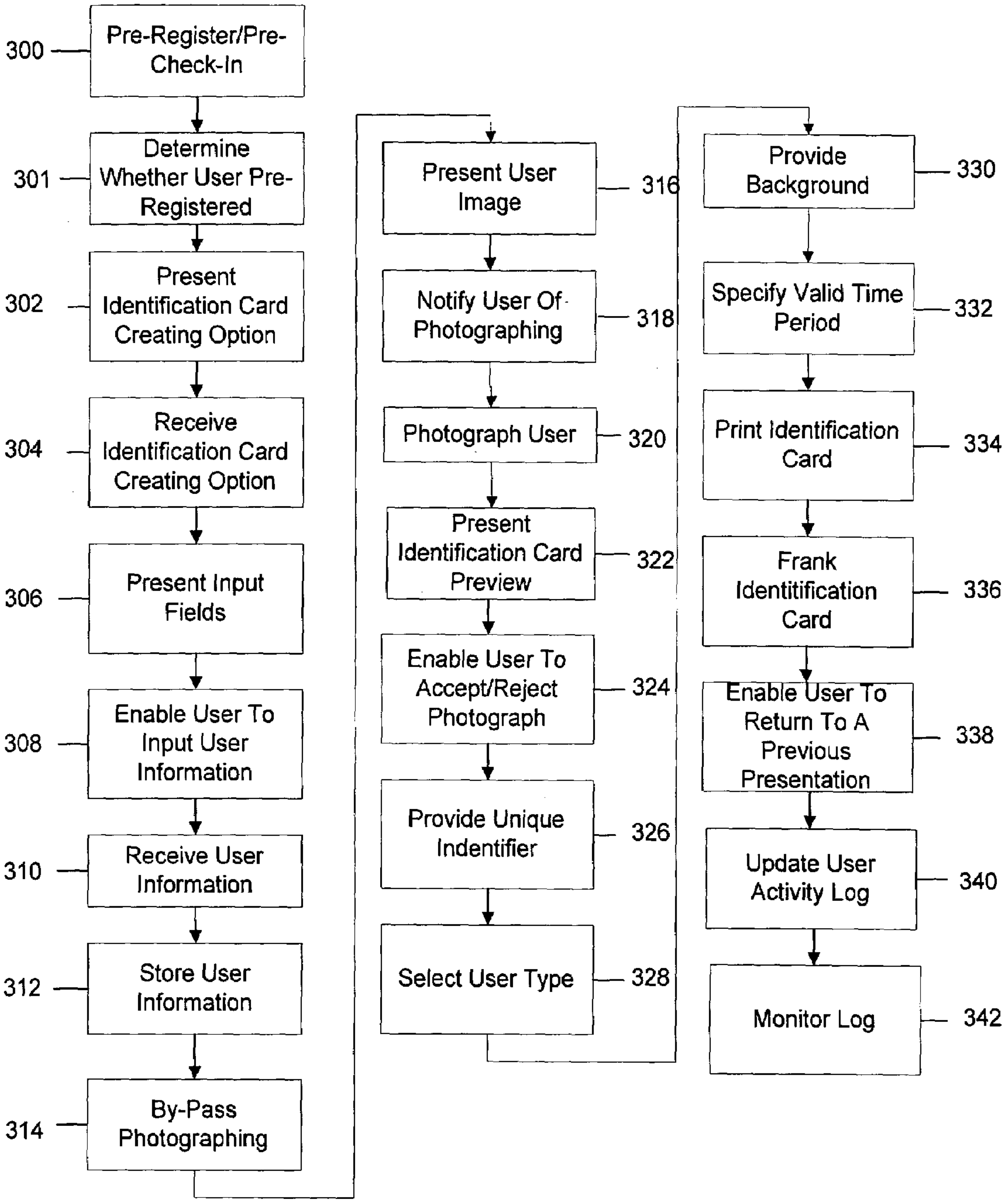
FIG. 3A is a method for monitoring access to a location using an identification card according to one embodiment of the invention.

FIG. 3A is a schematic block diagram of a method for monitoring access to a location using an identification card according to one embodiment of the invention. A user may pre-register and/or pre-check-in, step 300, as described above. A determination may be made regarding whether the user has pre-registered, step 301. This pre-determination may be made by guiding the user through a series of questions, each of which narrows the entire field of pre-registered users down to the user in question without disclosing who the other pre-registered users are because that information may be confidential. Similarly, this pre-determination may be made by asking the user for a media identifier such as a driver's license and then using the information on the identifier to synchronize the visitor to the visitor's appropriate place in the database. Finally, these two methods of winnowing and identification may be used in conjunction with one another. If the user has pre-registered, the user may pre-check-in and an identification card may be printed as described above. If the user has not pre-registered, the user may use a personal computer, laptop computer, workstation, Macintosh™ or other client device including a PDA for creating an identification card.

The client device may present the user with an identification card creating option in step 302. The user may select the identification card creating option using, for example, a conventional keyboard, computer mouse, light pen, touch screen, voice recognition software, or other selection mechanism. The identification card creating option selected may then be received, step 304. The user may be presented with one or more user information input fields, step 306. The input fields presented may be based on a static or dynamic template as described above. The user may be enabled to input responses to inquiries in the one or more user information input fields, step 308. As the user inputs information, this information may be presented in the user input fields as that information is being input by the user. The user information input fields may be pre-populated as described above. Based on the user information input, the user may be presented with a modified identification card creating process as described above. Alternatively, the user may be provided with an opportunity to perform a group check-in as described above.

The user information entered may be received, step 310. The user information received may be stored in a local or remote storage device, step 312. According to one embodiment, user information may be received from the local or remote storage device based on a unique identifier such as a user's email address and pre-populated as described above. The user may be provided with an opportunity to modify information that has been pre-populated if, for example, the information has changed since the user's last visit.

A determination may be made regarding whether one or more steps for obtaining a photograph of the user has been by-passed, step 314. The determination may be made, for example, by determining whether a particular keystroke combination has been entered by a system administrator. If a determination is made that the system administrator has not entered the keystroke combination, the method may continue by obtaining a photograph of the user as described below. If a determination is made that the system administrator has entered the keystroke combination, the method may continue by printing the identification card as described below. According to one embodiment, the step of determining whether the steps for obtaining a photograph of the user have been by-passed may also be used to present an icon on a welcome screen that indicates to the user whether the steps for obtaining a photograph have been by-passed. Additionally, should the template for the badge layout designated by the system administrator not include a photograph the step of taking and printing a photograph will not be executed.

In step 316, an image of the user may be presented for obtaining a photograph of the user. An image of the user may be obtained and presented as described above. The user may be requested to select an option that a photograph be taken. Upon selecting the photograph option, the user may be notified as to a time when the photograph is to be taken, step 318. Upon expiration of the time or after notifying the user, a photograph of the user may be taken, step 320. In an alternate embodiment the system may be operated by an attendant who aims a camera at the visitor and takes a photograph. Under this scenario there is no system-generated countdown, though there remains an opportunity to retake the photograph.

A preview of an identification card to be printed with the user information and image may be presented to the user in real-time, step 322. The preview may subsequently include the photograph of the user obtained. The user may be enabled to accept or reject the photograph, step 324. The preview of the identification card may be based on a pre-defined identification card template stored, for example, at a client device or local or remote server. According to one embodiment of the invention, an appearance of the identification card presented using the pre-defined template may only be altered by, for example, a system administrator and on the server side. This enables the appearance of the identification card to be formatted on the server side of the system. Alternatively, formatting be performed at the client side. Preferably, however, the system does not offer a system user the capability of altering an appearance of the identification card. One benefit of constraining template design to a trusted, central system administrator is that security is enhanced because the administrator may design badges that indicate a user is to be trusted. For example, a badge may specify "Escort Required" or "No Escort Required." Allowing a user to design his own badge would defeat this security mechanism.

According to one embodiment, the identification card preview provides a preview of the identification card in real-time. For example, as the user inputs responses to inquiries presented, input field step 306, the user information may be presented in the identification card preview in real-time. Additionally, the image of the user to be taken may be presented to the user in real-time. This real-time feedback increases the accuracy of the data input as well as manages visitors' expectations surrounding what their badges will look like when printed, which increases user acceptance with, and thus compliance to, the system.

A unique identifier for the identification card may also be provided in the identification card preview, step 326. The unique identifier may be, for example, a barcode, unique serial number or other unique identifier. The unique serial number, for example, may be generated using a biometric identifier such as the user's thumbprint as described above. The user may then be requested to select a user type, step 328. The user type may be, for example, employee, contractor, guest or other type. Depending on a user type selected, a background for the photograph may be provided, step 330. The background may vary depending on the user type. For example, all employee user type identification cards may have a background of a particular color, pattern, design or other identifying feature. Depending on the user type selected, a valid time period for the identification card may also be specified, step 332. For example, an employee user type may be valid for up to one year, a contractor user type may be valid for a user specified time period of up to two weeks, and a guest user type may be valid for up to one day. In an alternate embodiment the dynamic template may contain information about the length of time for which a badge is valid. In another embodiment an attendant, which is usually a receptionist or guard, may assist the visitor in creating the visitor badge, including the step of choosing which template (and, thus, which visitor type and access rights) should be assigned to an individual visitor.

After inputting and specifying all identification card information required, the user may print the identification card, step 334. The identification card may be printed as described above. The identification card may be printed on a variety of print media as described in further detail below. The user may also be provided with an option of re-printing the identification card if, for example, the user experiences difficulties in printing the identification card. The identification card may be franked, step 336, as described above. The user may also be enabled to return to a previous display or an initial display, step 338.

A user activity log may be maintained regarding when a user created and/or printed an identification card. The user activity log may be updated each time an identification card is created, printed, step 340, or used to scan into or out of a venue. The user activity log may include user information, time, date, and location for a user's access to the location. This enables security and/or other personnel who have adequate rights to the system regardless of whether they are based at the location or elsewhere to monitor who is accessing the location in real-time or to later audit visitor information. The user activity log may be maintained at a remote or local server. The user activity log may be, for example, a log file as described above and used as described above or a database, including an RDBMS.

Figure 3B:
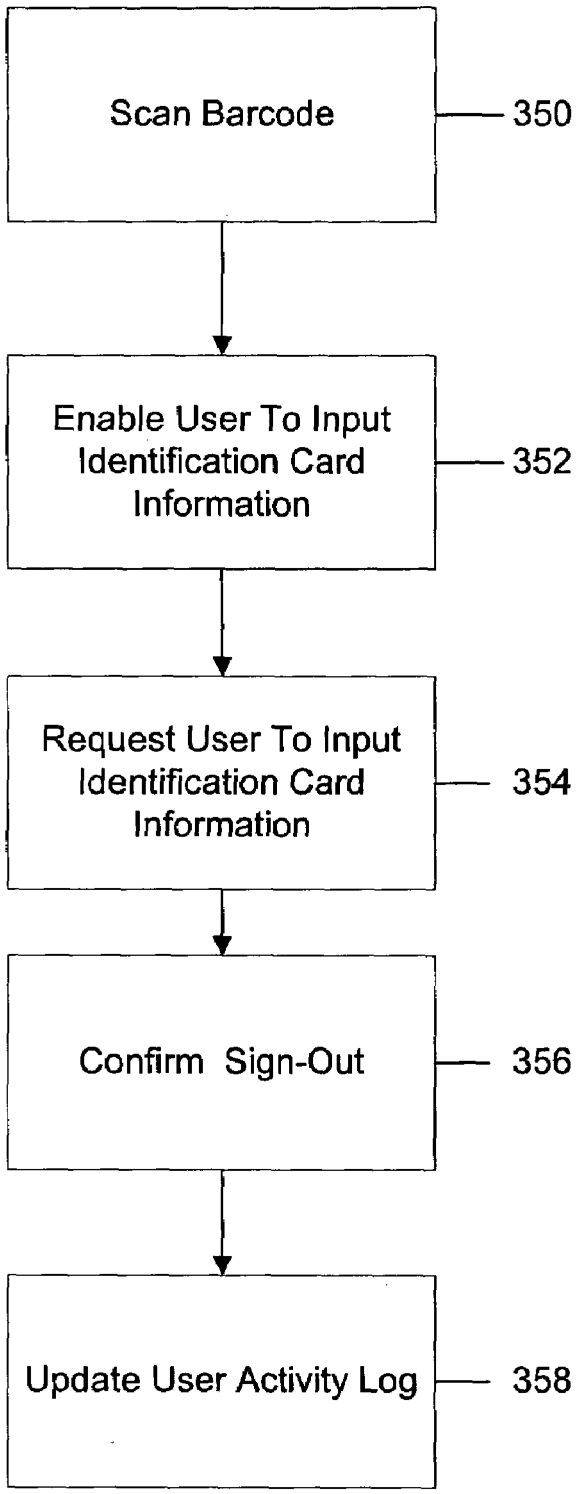
FIG. 3B is a method for monitoring access to a location using an identification card according to one embodiment of the invention.

FIG. 3B is a block diagram of a method for signing out a user that has entered a location using an identification card. The user may scan a barcode printed on the identification card, step 350. If the user experiences difficulty in scanning the barcode, the user may be enabled to input identification card information, step 352. The user may be requested to input identification card information, such as a unique identification number printed on the identification card, step 354. The user may be presented with an input field into which the user may input the unique identification number printed on the identification card.

When either a bar code is scanned or a unique identification number input by user is recognized, the user may be presented with a confirm sign-out option, step 356. If the user selects the confirm sign-out option, a centralized activity log may be updated with information regarding when a user exited the location, step 358. The information may include, for example, the user's identification card information, date and time of exit, location or other information.

Figure 4:
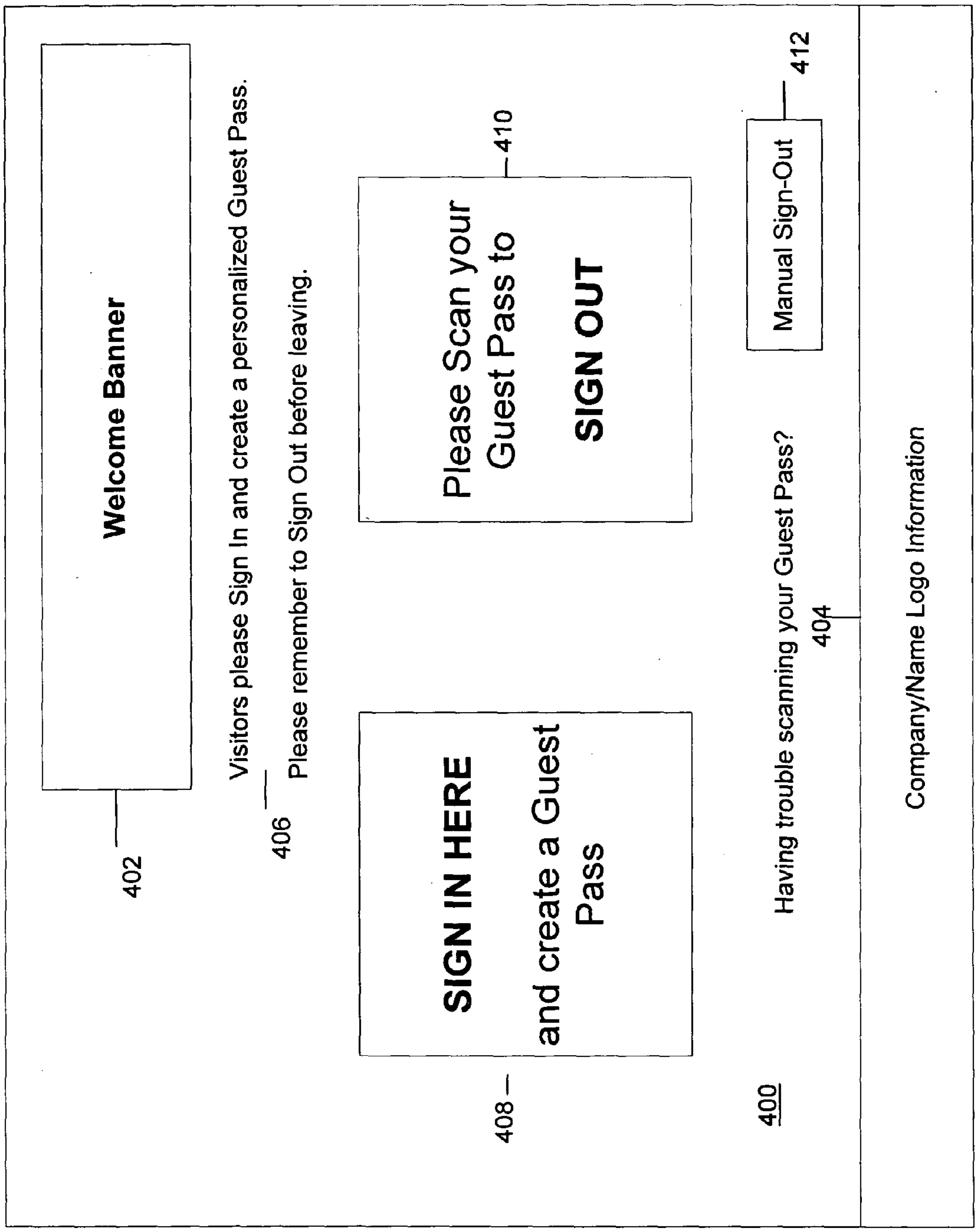
FIG. 4 is a welcome screen of a system for monitoring access to a location that may be presented to a user according to one embodiment of the invention.

FIG. 4 illustrates a welcome screen 400 that may be presented to a user upon using a system for monitoring access to a controlled access location using an identification card. The welcome screen 400 may include a welcome banner 402, company name/logo information 404, and user instructions 406. The welcome screen 400 may also include a create identification card option 408. The create identification card option 408 may include a friendly welcome message, for example, "Sign-in here and create a name badge." The welcome screen 400 may also include a sign-out notification 410. The sign-out notification 410 may read, for example, "Please scan your name badge to sign-out." A manual sign-out option 412 may also be presented to the user. The manual sign-out option 412 may be used as an alternative to scanning a name badge to sign-out of the system if the barcode scanner is not attached or is malfunctioning. By selecting the manual sign-out option 412, a unique identification number input field may be presented to the user. The user may input the identification number printed on the identification card using any known input mechanism. The user may submit the unique identification number to the system and, if recognized, the user is signed-out. If the unique identification number is not recognized, the manual sign-out option 412 may request that the user re-input and re-submit the unique identification number. This process may be repeated until the unique identification number is recognized, a barcode on the identification card is scanned properly or another sign-out process is completed, for example, the user may manually sign-out by completing a sign-out sheet.

Figure 5:
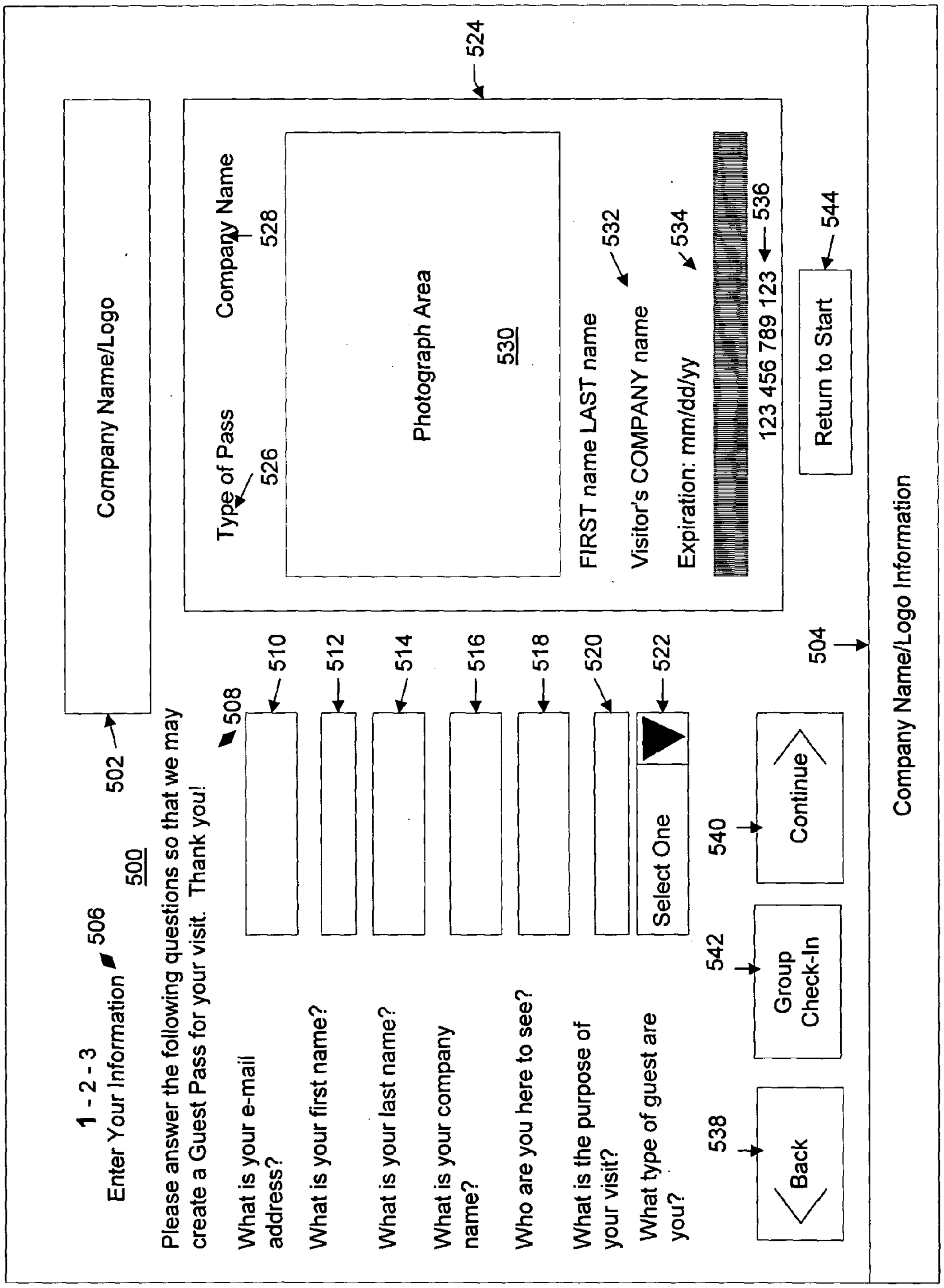
FIG. 5 is a user information input screen of a system for monitoring access to a location that may be presented to a user according to one embodiment of the invention.

If the user selects the option to create an identification card 408 the user may be presented with an information input screen 500 as shown in FIG. 5. This information input screen 500 may include a welcome banner 502, company name/logo information 504, and screen description 506. The screen description 506, may indicate a step at which the user is preceding and may describe the step. For example, user information input screen 500, may be described as step 1 by an indication of "1-2-3" and a description of "Enter Your Information." Dividing badge data entry into a discrete and small number of steps helps users feel they know how long their use of the system will take, which helps them to remain comfortable with the system, which encourages compliance. The user information input screen 500 may also include user instructions 508. The user information screen 500 may include one or more inquiries for which the user may provide a response in one or more input fields 510–522. The inquiries are derived from the template chosen by the system administrator or attendant, depending upon how the system is configured, and may include, for example, the user's first name, last name and electronic mail (email) address, company name, person visiting, purpose of visit, and guest type. After receiving the user's email address in input field 510, the user's email address may be used to receive stored user information that may be used to pre-populate the other input fields 512–522 as described above. The user may be provided with an opportunity to modify information that has been pre-populated if, for example, the information has changed since the user's last visit. Regarding guest type, the user may be presented with one or more options for a guest type. The guest types may be defined by a central system administrator and may include, for example, employee, contractor, and guest. The user types may be presented in, for example, a pull-down menu or located adjacent selectable radio buttons.

User information input screen 500 may also include a preview 524 of an identification card to be printed. The preview 524 may include a plurality of fields defined by the system administrator in a prior session. Some of these field types may include the type of pass 526, company name 528, photograph area 530, user information 532, bar code 534, and unique identification number 536. Each of the items in the preview 524 may be presented in a location as they are to be printed on the identification card. The preview of the identification card as well as the printed identification card may be based on a pre-defined identification card template stored, for example, at a client device or server. According to one embodiment of the invention, an appearance of the identification card presented using the pre-defined template may only be altered by, for example, a system administrator. This enables the appearance of the identification card to be formatted on the server side of the system. Alternatively, formatting be performed at the client side. Preferably, the system does not offer a user the capability of altering an appearance of the identification card because allowing a user to design their own badge could increase complexity and decrease security.

A back option 538 may also be presented that enables the user to return to a previous screen. A continue option 540 may be used to enable the user to continue creating the identification card. A Group Check-In option 542 may be used to enable a group of users to check-in less time than if they individually created visitor badges. The Group Check-In option 542 may present a modified input screen that requests only, for example, a user's first name and last name and a photograph taking portion of the system may be by-passed as described above. A return to start option 544, may be presented to enable the user to return to a welcome screen initially presented upon accessing the system.

Figure 6:
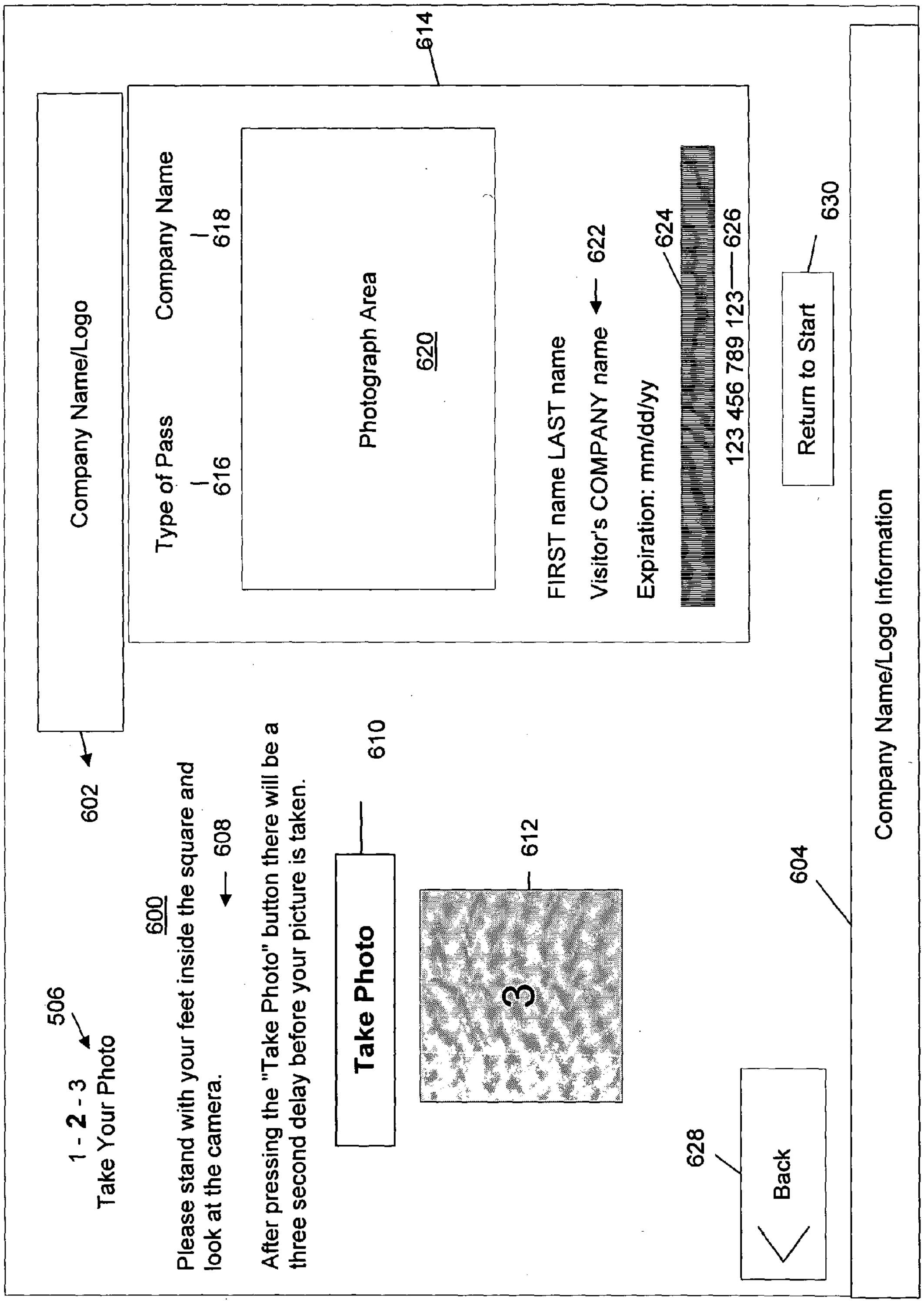
FIG. 6 is a photograph requesting screen of a system for monitoring access to a location that may be presented to a user according to one embodiment of the invention.

FIG. 6 illustrates a photo screen 600 that may be used in accordance with one embodiment of the invention. The photo screen 600 may include a welcome banner 602, company name/logo information 604, and screen description 606. The screen description 606 may identify, for example, a step in which a user is progressing to create an identification card and may include a description of the step. For example, photo screen 600 may be described as "1-2-3" and be described as "Take Your Photo." User instructions 608 may also be provided. The user instructions 608 may instruct the user regarding how to take a photograph to be printed on the identification card. For example, the user instructions may instruct the user where to stand with respect to a camera and how to initiate a taking of the photograph. These instructions may be on-screen prompts or verbal commands spoken by a computer sound synthesizer or pre-recorded voice. The user may initiate a photograph taking by selecting a take-photo option 610. After selecting take-photo option 610, the user may be presented with, for example, a timer 612, that counts down a time period before a photograph is to be taken. The time period may be, for example, three (3) seconds.

The take-photo screen 600 may also include a preview 614 of an identification card to be printed. The preview 614 may indicate a user type pass 616, and company name 618. A photograph area 620 may also be provided to present a user with a real-time image of a photograph to be taken. For example, as a user is taking a photograph, the image to be photographed may be presented in photograph area 620. In this manner, the user may be aware of the image to be photographed. The preview 614 may also include the user information 622, input by the user, a bar code 624, and unique identification number 626. Each of the items presented in the preview 614 may be presented in a location where that information is to be printed on the identification card.

A back option 628 may also be presented that enables the user to return to a previous screen. A return to start option 630 may also be presented to the user. The return to start option 630 may return the user to an initial screen presented to the user upon accessing the system. The user may select the take-photo option 610, back option 628, and return to start option 630, using any known selection mechanism.

Figure 7:
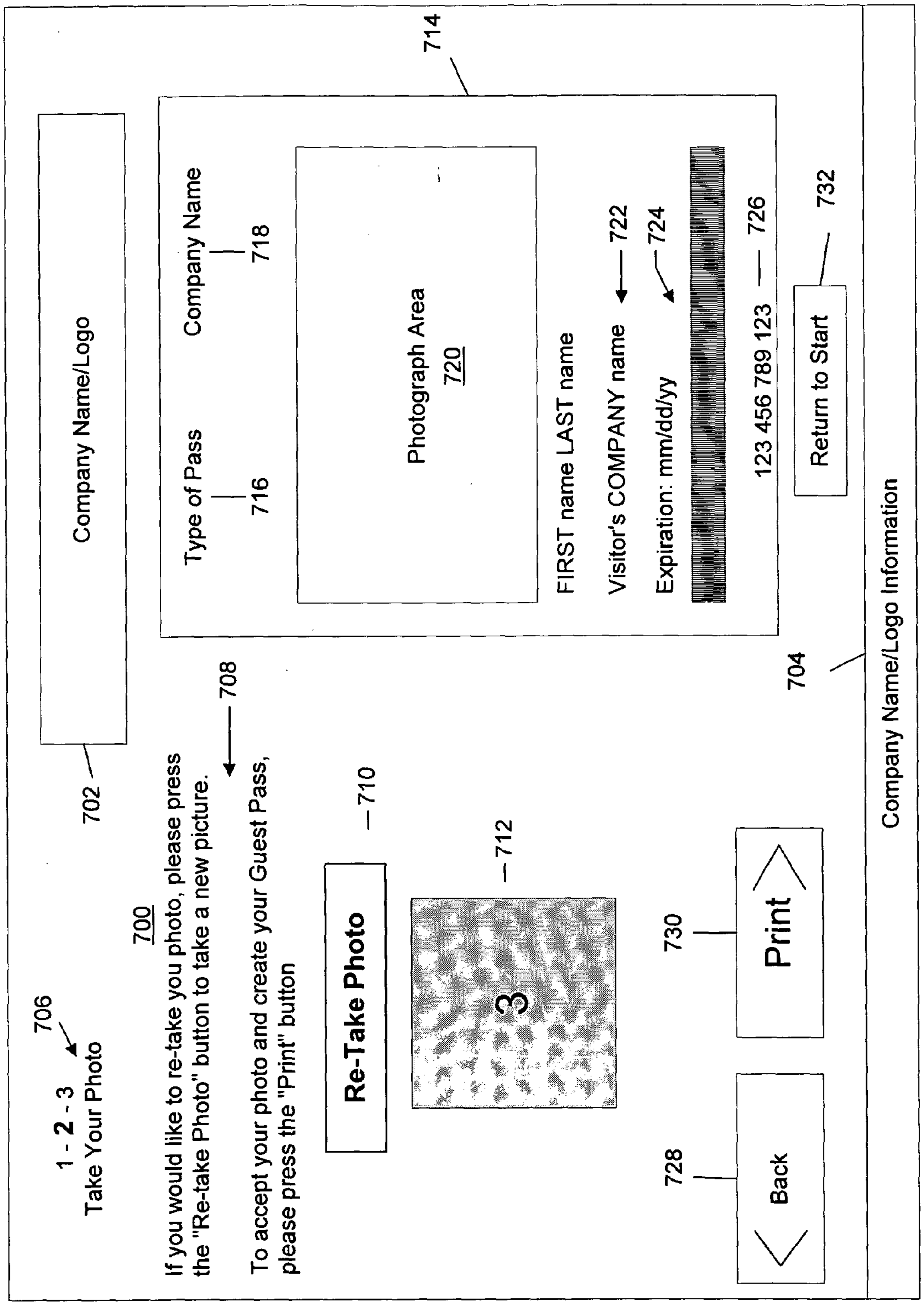
FIG. 7 is a photograph re-taking screen of a system for monitoring access to a location that may be presented to the user according to one embodiment of the invention.

FIG. 7 illustrates a re-take photo screen 700 that may be presented to a user after a photograph has been taken. The re-take photo screen 700 may include a welcome banner 702, company name/logo information 704, and screen description 706. The screen description 706 may be the same as the screen information description presented in take-photo screen 600 shown in FIG. 6.

User instructions 708 may also be presented to the user. The user instructions 708 may instruct the user regarding how to re-take a photograph if desired. The user instructions may read, for example, "If you would like to re-take your photo, please press the 'Re-Take Photo' button to take a new picture. To accept your photo and create your name badge, please press the 'Print' button."

A re-take photo option 710 and counter 712 may be presented to the user. The photo option 710, and counter 712, may be analogous to take-photo option 610 and counter 612, shown in FIG. 6. The re-take photo screen 700, may also include a preview 714 of an identification card to be printed. The preview 714, may include a user type 716, and company name 718. The preview may also include a photograph area 720 that presents the user with an image to be photographed should the user select re-take photo option 710. The preview 714 may also include the user information 722 input by the user, bar code 724, and unique identification number 726. As described above, the preview 714 may be based on a pre-defined template that may not be altered by the user.

A back option 728, print option 730, and return to start option 732 may also be presented to the user. The back option 728, and return to start option 732 may perform in a manner analogous to back option 628, and return to start 630, shown and described with reference to FIG. 6.

If a user elects to not have a photograph re-taken, the user may select print option 730, to print the identification card shown in the preview 714. If the user elects to not re-take the photograph, the preview 714, preferably includes all of the information that is to be printed on the identification card in a location where that information is to be printed.

Figure 8:
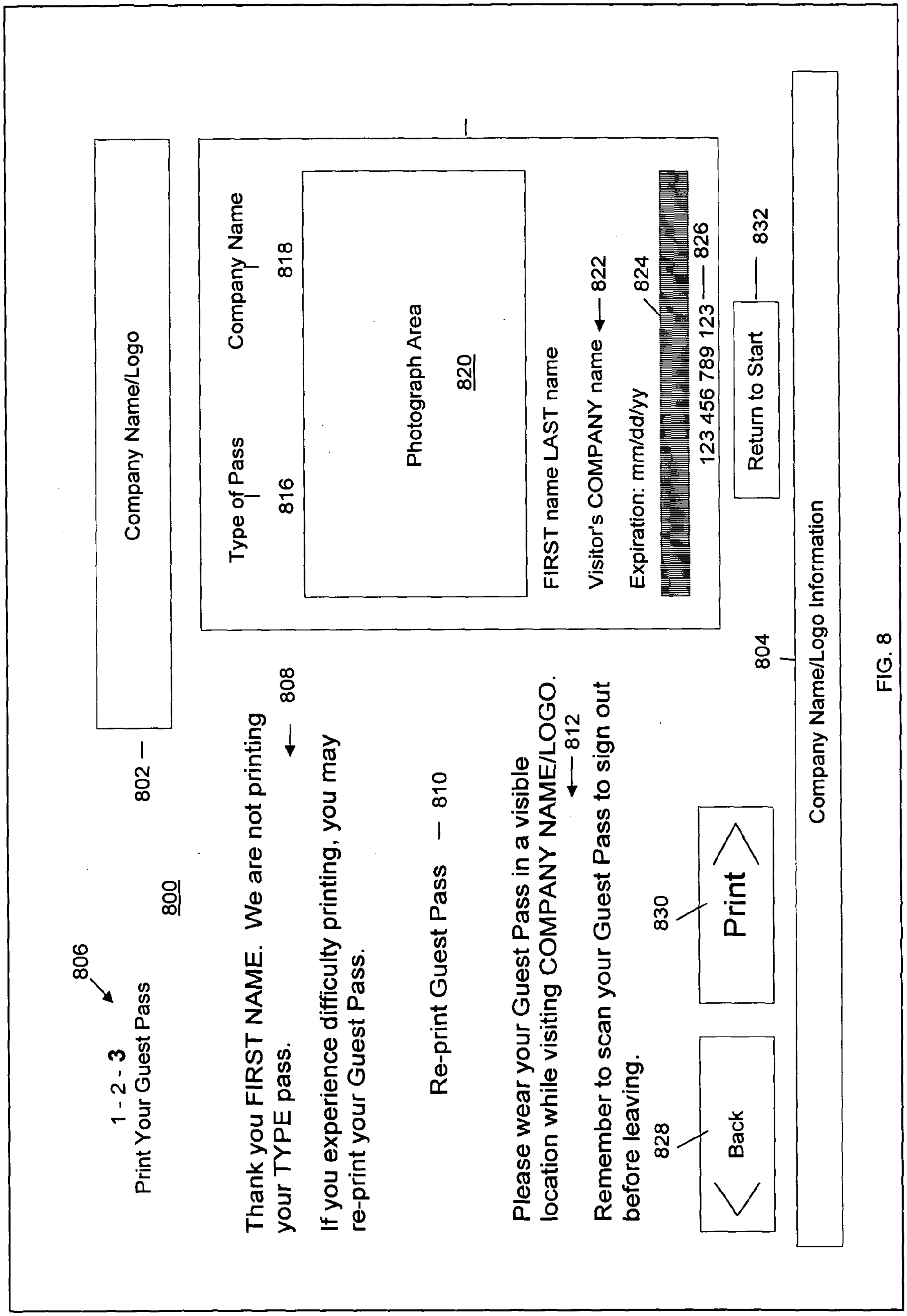
FIG. 8 is an identification card printing screen of a system for monitoring access to a location that may be presented to the user according to one embodiment of the invention.

FIG. 8 illustrates a print screen 800. The print screen 800 may include a welcome banner 802, company name/logo information 804, and screen description 806. The screen description information 806 may describe the print screen 800 as "1-2-3" and a description of "Print Your Name Badge."

The print screen 800 may also include user instructions 808. The user instructions 808 may advise the user regarding the printing status of the identification card and enable the user to reprint the name badge. The user instructions 808 may read, for example, "Thank you FIRST NAME. We are now printing your TYPE pass. If you experience difficulty printing, you may re-print your name badge." A re-print identification card option 810 may be presented to user. The re-print identification card option 810 may read, for example, "Re-Print Name Badge." The user may select re-print identification card option 810 to re-print the identification card, if, for example, the user experiences difficulty in printing the identification card.

The print screen 800 may also include additional information 812. The additional information 812 may read, for example, "Please wear your name badge in a visible location while visiting COMPANY NAME/LOGO. Remember to scan your name badge to sign out before leaving."

Print screen 800 may also include a preview 814 of the identification card as the identification card is to be printed. The preview 814 may be based on a pre-defined template and may include a user type 816, company name, photograph area 820, user information 822, bar code 824, and unique identification number 826 with each located in a position where that information is to be printed on the identification card.

The print screen 800 may also include a back option 828, print option 830, and return to start option 832. The user may use the back option 828, to return to a previous screen, the print option 830, to print the identification card presented in the preview 814, and the return to start option 832, to present an initial welcome screen presented to the user.

Figure 9:
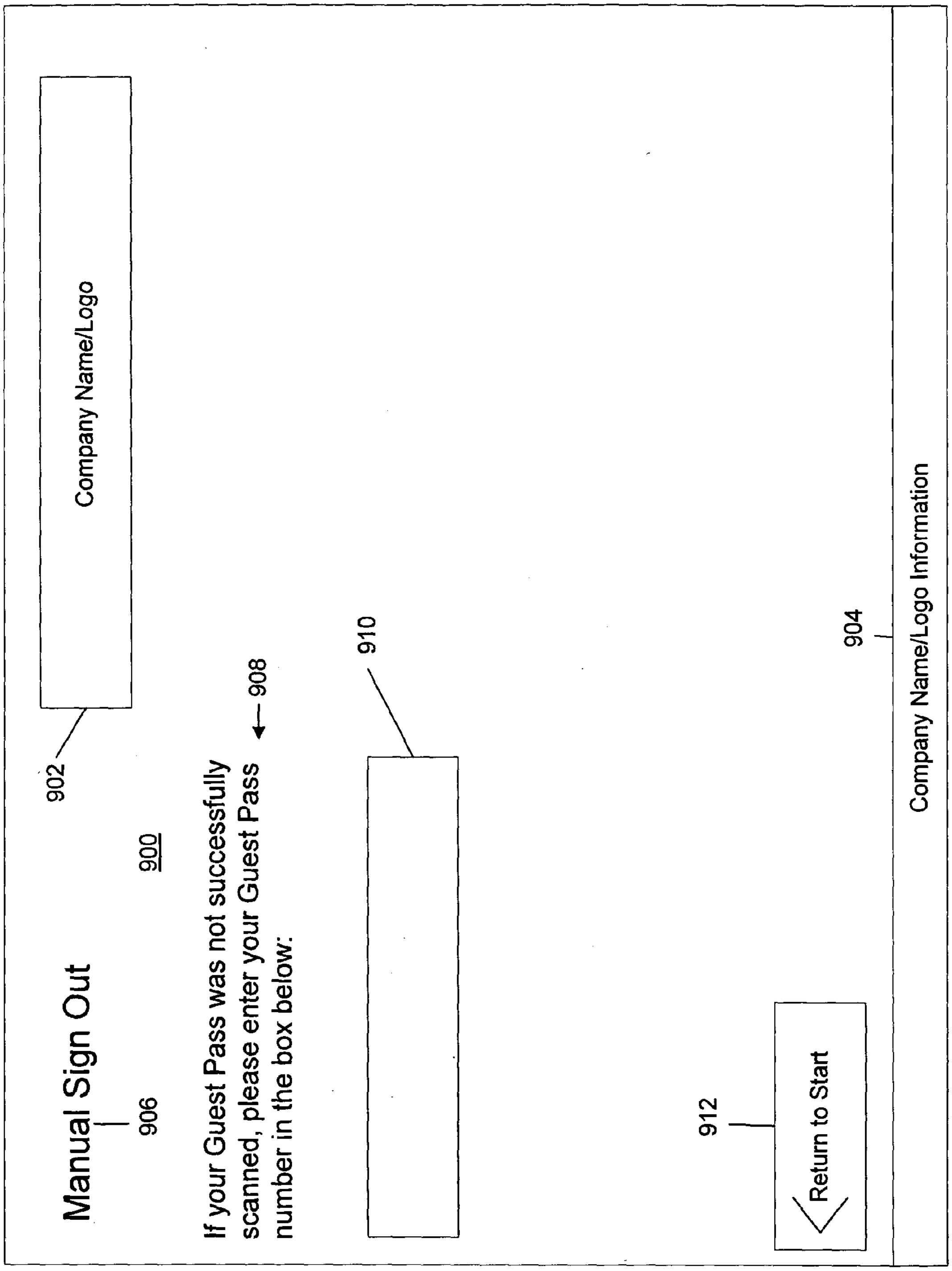
FIG. 9 is a manual sign out screen of a system for monitoring access to a location that may be presented to the user according to one embodiment of the invention.

FIG. 9 illustrates a manual sign-out screen 900 according to one embodiment of the invention. The manual sign-out screen 900 may include a welcome banner 902, company name/logo information 904, screen description 906, and user instructions 908. The user instructions 908 for the manual sign-out screen 900 may read, for example, "If your name badge was not successfully scanned, please enter your name badge number in the box below:". An input box 910 may be presented to the user where the user may input the unique identification number of the user's identification card. The user may submit the unique identification number for signing out of the system.

The manual sign-out screen 900 may also include a return to start option 912 that enables the user to return to an initial screen presented to the user. The user may submit the unique identification number input in the input field 910 to sign out of the system. If the unique identification number input by the user is not recognized, the user may be requested to re-input the unique identification number. This process may continue until a unique identification number is recognized or a bar code of the identification card is properly scanned.

Figure 10:
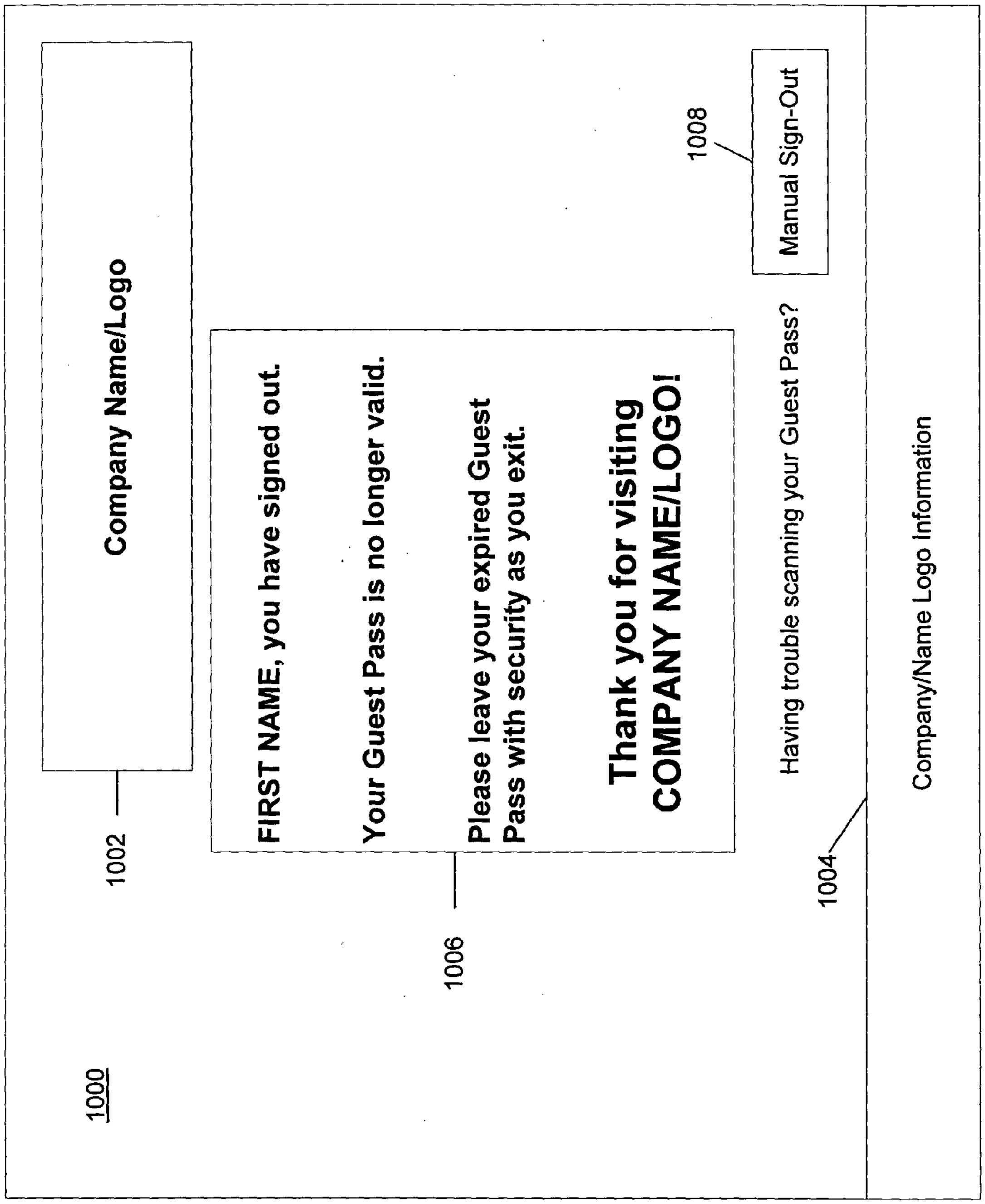
FIG. 10 is an exit screen of a system for monitoring access to a location that may be presented to a user according to one embodiment of the invention.

FIG. 10 illustrates a sign-out screen 1000 according to one embodiment of the invention. The sign-out screen 1000 may include a company name/logo banner 1002, and a company name/logo information 1004. A sign-out information portion 1006 may be presented to the user. The sign-out information portion 1006 may read, for example, "FIRST NAME, you have signed out. Your name badge is no longer valid. Please leave your expired name badge with security as you exit. Thank you for visiting COMPANY NAME/LOGO!" A manual sign-out option 1008 may also be presented to the user. If, for example, the user is having difficulty scanning the bar code on the identification card, the user may select manual sign-out option 1008. A manual sign-out option 1008 may present a screen to the user as described with reference to FIG. 9. The sign-out screen may include a confirmation requesting that the user confirm a desire to sign-out.

FIG. 11 illustrates one report, in response to a query, of the visitor activity log that may be maintained according to one embodiment of the invention. The report may include a list of checked-in visitors and checked-out visitors. For each type of visitor, the report may indicate the name of the visitor, location within the location, person visited, check-in time, and check-out time. The check-in time and check-out time may also include the date of check-in and check-out. The data for the report is extracted from a visitor log, which may be maintained at a server that is remote or local to the location.

According to one embodiment, the log of user activity is preferably maintained at a remote server of the system. If the log is maintained at a remote server, a temporary log file may be written at the client. In this manner, the client may not be required to communicate with the server to obtain information in the log. One benefit of maintaining the log on a remote server is that it remains more secure, because it can reside in a climate controlled room designed for the purpose of hosting secure servers that is hardened against power outages, static electricity, intruders, natural disasters, and other similar catastrophes. The design of the system, which allows the server to be stored on a different computing platform in a different geographical area than the clients, is in itself a benefit.

The invention also relates to various types of print media that may be used for printing the identification cards. One type of print media may be a spot metallic print media that has a printable coating that becomes transparent when printed with Inkjet inks. The spot metallic print media that includes a printable coating. Beneath the printable coating, which may be white and opaque when unprinted, there may be a metallic foil layer. Any printed area may thus appear to be metallic in nature, even though they are printed with a standard desktop inkjet printer. The material may be configured in a variety of ways, for example, as a card stock or label stock, as a self-laminating product, and in various sheet sizes. The spot metallic media may be produced in a secure print facility in small batches, such that when printed a message is revealed that the badge is valid for a particular company.

Another type of print media may be print media that uses, for example, a 4×6 inch sheet that may be inserted into inkjet or LaserJet™ printers and then break a smaller printed identification card away from the sheet. The 4×6 sheet is preferable because 4×6 sheets are supported by many standard printers. The 4×6 sheet may be sized to fit a variety of applications. For example, the sheet may be sized to fit into a specific sleeve or identification card holder. One or more identification cards may be printed on the 4×6 sheet. Alternatively, the print media may be in roll-form. A roll may be used to continuously form feed a plurality of identification cards into an InkJet or LaserJet™ printer. The identification cards may then be broken away from the roll. The sheet or roll may be produced in, for example, matte or glossy versions and in various colors and textures of materials. Use of a 4×6 inch sheet with a die-cut allows the invention to print individual visitor badges using standard color inkjet or color laser printers, rather than the more expensive PVC thermal printers described above.

Another type of print media may be a validity indicator print media. The validity indicator print media may alter in appearance over time. The validity indicator print media may enable a user to activate a time function of an identification card when the identification card is issued. For example, the activation may be initiated by bringing two separate layers of the print media into contact with one other. The time function may result in a change in appearance of the badge after a pre-established time period. For example, a time period may be built into the badge prior to sale. The change in appearance may be a color change or the appearance of text or graphics to indicate that the badge is no longer valid. The print media may be formed such that the print media alters in appearance after approximately eight (8) hours. Additionally the validity indicator may be an auto-catalytic chemical reaction, triggered by the moisture of ink in an inkjet printer, the heat and pressure of a laser printer, or water or another chemical applied via a writing instrument after the visitor badge is produced.

Another type of print media is a clean edge print media. Clean edge print media may use a material that is a printable card stock that may be die-cut into identification card shapes, but held together to an overall sheet assembly by a dry laminate to a carrier. Alternatively, an ultra-removable adhesive to a carrier or a tape along the die-cuts may be used to maintain the identification card to the sheet assembly. The clean edge print media may be a pre-cut identification card that may be peeled away from the sheet assembly leaving clean edges and no adhesive or sticky residue on the identification card. The clean edge print media may be produced in a variety of sheet sizes and die-cut formats using a variety of card stock types.

One type of print media is a self-laminating print media described in U.S. Pat. Nos. 6,159,570 and 5,662,976, both of which are hereby incorporated by reference in their entirety. The self-laminating print media may be single-sided or double-sided. The self-laminating print media may be adhered to an RFID card.

Another type of print media may be an erasable print media. The erasable print media may enable information printed with a permanent marker to be erased. Examples of erasable print media are described in U.S. Pat. Nos. 5,736,525 and 5,587,408, both of which are hereby incorporated by reference in their entirety.

Another type of print media may be a lenticular sleeve print media. The lenticular sleeve print media may include indicia that may be viewed only using a particular lens material. The particular lens material may be, for example, a plastic sleeve or holder into which the print media is inserted. Such lenticular sleeve print media is described in U.S. Pat. No. 5,346,259 all of which is hereby incorporated by reference.

Another type of print media may be a dry laminate having a clean edge. The laminate may be die-cut to form two sections of the identification card. The two sections may be separated by, for example, a score line. The identification card may then printed in two sections with information printed on opposite sides of the score line along one side of the identification card. The two sections may be printed substantially simultaneously. The identification card may then be folded along the score line to produce a two-sided identification card.

Another type of print media may be two-sided perforated card stock. The card stock may include one or more outlines of identification cards. The identification cards may include a score line substantially centered along one direction. The card stock may be printed on opposite sides. The identification cards may be punched-out from the card stock and folded along the score line to produce a two-sided identification card.

Another type of print media may be a label that includes an adhesive and a removable liner. The label may be die-cut to form one or more identification cards having any desired shape. Preferably, the identification cards have a score line substantially centered along one direction thereof to form two panels. The two panels may be printed substantially simultaneously. The identification cards that include the label and adhesive may be removed from the liner. The two panels of the identification cards may be folded along the score line substantially on top of one another. Alternatively, the two panels may be folded onto opposite sides of a base to form a two-sided identification card.

Other types of print media may include label-type as is known in the art, glow-in-the-dark, holographic, electronic, pre-designed, etc. The holographic identification cards may include a holographic image that may be formed into one area of the identification card. The electronic identification cards may include a printable material that enables an image to flash on and off or change for visibility or, alternately, a low-power screen that exhibits the characteristics of a printed visitor badge but that is later reusable. The embodiment of this type of media that is printed but then attached to an electronic timer may be powered by a battery and may include features such a, a visible time clock, changing display over time, expiration notification, etc. The glow-in-the-dark, holographic, electronic, and pre-designed identification cards may be, for example, a label or card that may be offered in a variety of sheet sizes or die-cut configurations. One benefit of glow-in-the-dark visitor badges is that they remain visible in emergencies that remove light: this becomes particularly helpful if the badges contain safety information.

The system also allows for a remote attendant or receptionist. Self-service kiosks or other clients could be provided at a number of separate facility entrances. The check-in and badge creation process could be monitored by a remote attendant having an attendant terminal which allows the attendant to monitor activity on all of the client terminals. The remote attendant could also be provided with two-way audio communication and one-or-two-way video communication with visitors at the facility entrances, such that the visitors could ask for and receive assistance with the badge creation process. The attendant terminal could also be provided with the ability to take over control of a particular client station and thereby input the data in response to information provided by the visitor, to take the photograph, and otherwise control the identification card creation station. The attendant could tell the visitor to place the identification card media within the printer, view the media and printer, and give the visitor additional instructions if the media was not placed within the printer with the proper placement and orientation. In this way a remote attendant can provide instruction to the client thus rendering it unnecessary for the visitor to provide data via the user interface that the visitor would otherwise be required to enter himself. Once the visitor has been verified and a photographic identification badge created for him, the remote attendant could call the person visited to advise her that her visitor is waiting and ready in the lobby for pickup. Alternatively, if the visitor needs no escort the remote attendant could remotely unlock the security door to the facility once the visitor had checked in and had created his badge. In this way, a single attendant using the system of the present invention could provide attendant and receptionist services for a large number of facility entrances, thereby eliminating the need for an attendant to be physically present at each facility entrance.

Although the present invention is well suited for use in making visitor identification badges at the lobby of a secure facility, the invention can be used in nearly any environments in which a display card or identification card or badge is desired. The invention can be used, for example, at events such as trade conventions and entertainment events. The invention can be used by schools, clubs, day-care facilities, permanent and temporary military bases, and governments. The invention can be used to create identification cards for selected participants or attendees for events, such as media passes for members of the media, and identification cards for athlete-participants. Cards can be created with different colors, backgrounds, or other identifying characteristics based upon the level of access to be granted. For example, at a track and field meet athlete-participants, member of the press, event organizers, and security personnel, can all be given badges made according to the present invention that have multiple and/or differently colored stripes, patterns, and/or backgrounds, depending on the level of access to be given to that individual to the event field, the press box, and to security planning areas, and depending on the individual's position and day(s) of participation. A badge for a child-care facility may have a large photograph of a particular child with smaller photographs of the people authorized to pick the child up.

In the specification and the claims appended thereto, a user of the system is sometimes referred in the masculine, such as with a reference to "his photograph" or "his name" and the like. It will be understood that the user may be a woman, and that the words "he," "him," "her," and the like which are used for brevity in the specification and claims, will be understood to refer more generally to he/she, him/her, and his/her, respectively. Thus, the specification and claims are not limited to any particular gender. It will also be understood that the term "identification card" is an umbrella term intended to cover identification badges worn by a user, as well as identification papers carried by not necessarily worn. The invention disclosed herein is applicable to identification badges as well as other types of identification cards including purely electronic, completely portable, low-power screens.

The phrase "computer readable media" in the claims will be understood to refer to any computer readable media, including without limitation an optical memory such as a hard disc, a magnetic tape, a magnetic floppy disc, a magnetic hard disc installed within a hard drive in a computer, as well as volatile memory such as RAM.

While the specification describes particular embodiments of the present invention, those of ordinary skill can devise variations of the present invention without departing from the inventive concept. For example, a greater number of or fewer modules may be used, the steps recited may be performed in a different order, other steps may be added may be omitted, various print media types described may be provided in roll form, and other variations also exist.

We claim:

1. A system for producing a photographic identification card comprising:

a camera for taking a photograph of a user, the photograph defining a user's photograph;

a printer;

identification card media, the identification card media including at least one predefined identification card boundary; and computer readable media containing computer instructions capable of causing a programmable computer operatively connected to the camera, the printer, and to a user interface, to:

prompt the user to input the user's name at the user interface;

cause the camera to take the user's photograph;

cause the printer to print identification card indicia including at least the user's name and photograph onto the identification card media within the predefined identification card boundary; and store to non-volatile memory the user's name and photograph, the user's name and photograph being associated together within the memory.

2. The system of claim 1 further comprising:

written instructions provided to the user for manipulating the identification card media with the identification card indicia printed thereon to produce the photographic identification card.

3. The system of claim 2 wherein the written instructions are instructions printed on paper.

4. The system of claim 2 wherein the written instructions are instructions presented to the user on a display screen.

5. The system of claim 1 wherein the user inputs the user's name at the user interface by swiping a driver's license through a magnetic card reader.

6. The system of claim 1 wherein the user inputs the user's name at the user interface by selecting a name from a pick list.

7. The system of claim 1 wherein the user inputs the user's name at the user interface by spelling his name on either a keyboard or a touchscreen keypad.

8. The system of claim 1 wherein the camera is a webcam.

9. The system of claim 1 wherein the computer instructions are further capable of causing the programmable computer to display on a display screen for the user a preview of the identification card indicia in an arrangement that is substantially identical to an arrangement on which it will be printed onto the identification card media, thereby allowing the user to see a preview of the photographic identification card.

10. The system of claim 1 wherein the camera and the printer are housed within a self-serve kiosk.

11. The system of claim 1 wherein the printer is a desktop printer.

12. The system of claim 11 wherein the desktop printer is a color inkjet printer or a color laser printer.

13. The system of claim 1 further comprising:

a log creation module, the log creation module capable of retrieving names and photographs of a plurality of users for whom photographic identification cards have been created, and generating reports pertaining thereto.

14. The system of claim 1 wherein:

the system retains data pertaining to the user after a first visit by the user;

upon a second visit, the user can recall the retained data for use in creating a second identification card such that the user can avoid certain information entry steps that were required of the user upon the user's first visit.

15. A system for producing a photographic identification card comprising:

a camera for taking a photograph of a user, the photograph defining a user's photograph;

a printer;

a computer operatively connected to an operator interface the camera, and the printer, the computer being programmed to:

prompt the user to input the user's name at the user interface;

cause the camera to take the user's photograph;

cause the printer to print an identification card including at least the user's name and photograph;

store to non-volatile memory the user's name and photograph, the user's name and photograph defining retained data;

wherein the system prompts the user upon a first visit to enter an email address and the system stores the retained data in association with the email address; and upon a second and subsequent visit by the user the user can enter the email address whereupon the system will recall the retained data and use the retained data in printing a second identification badge.

16. The system of claim 1 further comprising a bar code reader, and wherein the identification card indicia printed on the identification card indicia includes a bar code which can be read by the bar code reader.

17. The system of claim 1 wherein the identification card indicia printed onto the identification card includes additional information entered by the user.

18. The system of claim 1 wherein the identification card indicia printed onto the identification card includes information previously entered by the user over an Internet connection.

19. A system for producing a photographic identification card comprising:

a camera for taking a photograph of a user, the photograph defining a user's photograph;

a printer;

computer operatively connected to the camera, the printer, and to a user interface, the computer being programmed to:

prompt the user to input the user's name at the user interface;

cause the camera to take the user's photograph;

cause the printer to print an identification card containing at least the user's name and photograph;

store to non-volatile memory the user's name and photograph, the user's name and photograph defining retained data;

wherein identification card indicia printed onto the identification card includes information previously entered via interaction with an electronic messaging and calendaring system.

20. The system of claim 1 wherein the identification card indicia printed onto the identification card includes additional information entered by someone other than the user.

21. The system of claim 1 wherein the identification card boundary comprises a boundary of the identification card media, the identification card media being less than a full size 8½×11 inch sheet and less than an A4 size sheet.

22. The system of claim 1 wherein the identification card boundary comprises at least one die cut within the identification card media.

23. The system of claim 1 wherein the identification card media comprises a printable facestock releasable adhered to a liner, the facestock having at least one die cut and one weakened line therein, such that the media may be printed upon by a single pass through the printer, and the facestock thereafter peeled away from the liner and folded along the weakened line to form a two-sided identification badge.

24. The system of claim 1 wherein the identification card media comprises a paper label sheet.

25. The system of claim 1 wherein the computer instructions include a photo retake function that allows a visitor to preview an image of a first photograph taken of him by the camera, and allows the visitor to initiate the taking of a second photograph for printing onto the identification card instead of the first photograph.

26. The system of claim 1 further comprising a signature capture device operatively connected to the computer, and wherein the user is prompted to sign at the signature capture device thereby creating a captured signature, the captured signature being stored in memory in association with the user's name and photograph.

27. The system of claim 26 wherein the identification card indicia printed onto the identification card further includes the captured signature of the user.

28. The system of claim 1 further comprising:

a card scanning device for scanning identification cards produced by the system.

29. The system of claim 28 wherein the card scanning device is a card scanning device for logging a user out when the user exits the facility.

30. The system of claim 29 wherein the computer instructions are further capable of causing the computer to create a list of all users currently within a facility in accordance with users for whom identification cards have been printed and users who have been logged out.

31. A system for producing a photographic identification card and tracking visitors comprising:

a camera for taking a photograph of a user, the photograph defining a user's photograph;

a printer;

computer readable media containing computer instructions capable of causing a programmable computer operatively connected to the camera, the printer, and to a user interface, to:

receive the user's name at the user interface;

cause the camera to take the user's photograph;

cause the printer to print an identification card including at least the user's name and photograph;

store to non-volatile memory the user's name and photograph, the user's name and photograph defining retained data;

a card scanning device for scanning identification cards produced by the system;

means for logging visitor entries and exits based at least in part on said scanning, and for producing a list of all users currently within a facility in accordance with users for whom identification cards have been printed and users who have been logged out;

wherein the list is sent electronically to an emergency governmental entity.

32. A method of controlling access to a secure facility comprising:

(a) providing at an entrance to a facility a camera, a user interface, and a printer;

(b) prompting a visitor to the facility to input his name to the input user interface;

(c) taking a photograph of the visitor via the camera;

(d) printing via the printer an identification card for the visitor, the identification card including at least the visitor's name and photograph;

(e) allowing the visitor to access a controlled geographical area within a building using the identification card; and (f) providing a person at a location remote from the facility entrance, the remote person performing step (e) based upon successful completion of steps (c) and (d).

33. A system for producing a photographic identification card comprising:

a computer operatively attached to a camera and a user input device for taking a first user's photograph, and storing said photograph in association with the first user's name and an email address for the first user;

the computer being programmed to prompt a subsequent user to input an email address, and if the email address input by the subsequent user matches the first user's email address, causing a printer to print a photographic identification badge featuring at least some information corresponding to said first user.

34. The system of claim 33, wherein said at least some information corresponding to said first user comprises a photograph and a name of said first user.

* * * * *

UNITED STATES PATENT AND TRADEMARK OFFICE

CERTIFICATE OF CORRECTION

PATENT NO. : 7,172,113 B2      Page 1 of 1
APPLICATION NO. : 10/662758
DATED : February 6, 2007
INVENTOR(S) : Michael Olenick et al.

It is certified that error appears in the above-identified patent and that said Letters Patent is hereby corrected as shown below:

At Claim 1, column 33, line 58 after “prompt the user to input the user’s name at the user interface:” insert -- present a preview of the identificaion card to the user, the preview being updated upon entry of each letter of the user’s name; --

Signed and Sealed this

Seventeenth Day of April, 2007

JON W. DUDAS
*Director of the United States Patent and Trademark Office*